(12) United States Patent
Kanai

(10) Patent No.: US 8,484,559 B2
(45) Date of Patent: Jul. 9, 2013

(54) DEVICE AND METHOD FOR THE MAGNIFICATION OF CONTENT HAVING A PREDETERMINED LAYOUT

(75) Inventor: Takeshi Kanai, Saitama (JP)

(73) Assignee: Sony Corporation, Tokyo (JP)

(\*) Notice: Subject to any disclaimer, the term of this patent is extended or adjusted under 35 U.S.C. 154(b) by 1436 days.

(21) Appl. No.: 10/669,249

(22) Filed: Sep. 25, 2003

(65) Prior Publication Data

US 2004/0135813 A1 Jul. 15, 2004

(30) Foreign Application Priority Data

Sep. 26, 2002 (JP) .................................. 2002-280256

(51) Int. Cl.
*G06F 17/00* (2006.01)
*G06F 17/20* (2006.01)

(52) U.S. Cl.
USPC ........... 715/252; 715/234; 715/238; 715/240; 715/242; 715/243; 715/764; 715/800; 715/801

(58) Field of Classification Search
USPC .............. 715/781, 764, 788, 500.1, 800, 801, 715/234, 238, 240, 242, 243, 252; 345/698, 345/660, 901
See application file for complete search history.

(56) References Cited

U.S. PATENT DOCUMENTS

| 5,185,813 | A | * | 2/1993 | Tsujimoto | 382/180 |
| 5,467,102 | A | * | 11/1995 | Kuno et al. | 345/1.3 |
| 5,555,362 | A | * | 9/1996 | Yamashita et al. | 715/209 |
| 5,557,722 | A | * | 9/1996 | DeRose et al. | 715/234 |
| 5,596,350 | A | * | 1/1997 | Capps et al. | 345/173 |
| 5,633,996 | A | * | 5/1997 | Hayashi et al. | 715/246 |
| 5,774,579 | A | * | 6/1998 | Wang et al. | 382/176 |
| 5,845,303 | A | * | 12/1998 | Templeman | 715/255 |
| 5,847,698 | A | * | 12/1998 | Reavey et al. | 345/173 |
| 5,848,184 | A | * | 12/1998 | Taylor et al. | 382/173 |
| 5,892,843 | A | * | 4/1999 | Zhou et al. | 382/176 |
| 5,893,127 | A | * | 4/1999 | Tyan et al. | 715/209 |
| 5,895,477 | A | * | 4/1999 | Orr et al. | 715/202 |
| 5,897,644 | A | * | 4/1999 | Nielsen | 715/210 |
| 5,903,902 | A | * | 5/1999 | Orr et al. | 715/202 |
| 5,987,171 | A | * | 11/1999 | Wang | 382/173 |
| 6,161,114 | A | * | 12/2000 | King et al. | 715/202 |

(Continued)

FOREIGN PATENT DOCUMENTS

| JP | 09-026769 | 1/1997 |
| JP | 2001-175386 | 6/2001 |
| JP | 2002-169793 | 6/2002 |

OTHER PUBLICATIONS

Akio Kabutogi, et al.,"X-Window OSF/Motif Programming", Nikkan Kogyo Newspaper Publishing Company, Jun. 10, 1992, vol. 1. pp. 82-85.

*Primary Examiner* — Steven B Theriault
(74) *Attorney, Agent, or Firm* — Oblon, Spivak, McClelland, Maier & Neustadt, L.L.P.

(57) ABSTRACT

A user terminal has two screens. One screen displays content in a state intended by the creator of the content. The displayed content is composed of a plurality of bocks, and each block can be enlarged. Content corresponding to a block for which enlargement is directed is displayed on the other screen. The content displayed in the other screen has an enlarged form. Regarding the enlargement, rules are set. For example, an image or the like that is the subject of processing to be enlarged is processed without changing vertical and horizontal ratios.

11 Claims, 22 Drawing Sheets

U.S. PATENT DOCUMENTS

| | | | |
|---|---|---|---|
| 6,414,698 B1* | 7/2002 | Lovell et al. | 715/800 |
| 6,486,890 B1* | 11/2002 | Harada et al. | 345/660 |
| 6,704,034 B1* | 3/2004 | Rodriguez et al. | 715/860 |
| 6,915,484 B1* | 7/2005 | Ayers et al. | 715/234 |
| 6,928,610 B2* | 8/2005 | Brintzenhofe et al. | 715/202 |
| 6,976,226 B1* | 12/2005 | Strong et al. | 715/788 |
| 7,010,746 B2* | 3/2006 | Purvis | 715/249 |
| 7,028,255 B1* | 4/2006 | Ayers | 715/202 |
| 7,051,276 B1* | 5/2006 | Mogilevsky et al. | 715/209 |
| 7,085,999 B2* | 8/2006 | Maeda et al. | 715/236 |
| 7,127,673 B2* | 10/2006 | Iwata et al. | 715/209 |
| 7,184,167 B1* | 2/2007 | Ito et al. | 358/1.18 |
| 7,203,364 B2* | 4/2007 | Yamazaki | 382/177 |
| 7,307,643 B2* | 12/2007 | Moroo et al. | 345/667 |
| 7,389,471 B2* | 6/2008 | Croney et al. | 715/209 |
| 7,555,170 B2* | 6/2009 | Oyabu et al. | 382/298 |
| 8,156,128 B2* | 4/2012 | Ramer et al. | 707/748 |
| 2002/0073122 A1* | 6/2002 | Iwata et al. | 707/525 |
| 2002/0091738 A1* | 7/2002 | Rohrabaugh et al. | 707/517 |
| 2003/0014445 A1* | 1/2003 | Formanek et al. | 707/526 |
| 2003/0069881 A1* | 4/2003 | Huttunen | 707/5 |
| 2003/0115167 A1* | 6/2003 | Sharif et al. | 707/1 |
| 2003/0217061 A1* | 11/2003 | Agassi et al. | 707/10 |
| 2003/0229845 A1* | 12/2003 | Salesin et al. | 715/500 |
| 2004/0003097 A1* | 1/2004 | Willis et al. | 709/228 |
| 2004/0017941 A1* | 1/2004 | Simske | 382/180 |
| 2004/0025109 A1* | 2/2004 | Harrington et al. | 715/500 |
| 2004/0049737 A1* | 3/2004 | Simon Hunt et al. | 715/513 |
| 2004/0103371 A1* | 5/2004 | Chen et al. | 715/513 |
| 2004/0146199 A1* | 7/2004 | Berkner et al. | 382/176 |
| 2004/0205315 A1* | 10/2004 | Ripley et al. | 711/163 |
| 2004/0205568 A1* | 10/2004 | Breuel et al. | 715/513 |
| 2004/0205609 A1* | 10/2004 | Milton et al. | 715/522 |
| 2005/0063010 A1* | 3/2005 | Giannetti | 358/1.18 |
| 2006/0064636 A1* | 3/2006 | Hua et al. | 715/526 |
| 2006/0168284 A1* | 7/2006 | Holthe | 709/231 |

* cited by examiner

FIG. 4

```
1  <Obj no="1" Type="Page">
2  <Referto no="2"/>
3  <Yspace no="20"/>
4  <Referto no="3"/>
5  <ChangeStart no="3"/>
6  <Xspace no="5"/>
7  <Referto no="4"/>
8  <Reset/>
9  <Xspace no="10"/>
10 <Yspace no="20"/>
11 <Referto no="5"/>
12 </Obj>

13 <Obj no="2" Type="Block">
14 <Init no="22"/>
15 <BlockRule no="1"/>
16 <Referto no="12"/>
17 </Obj>

18 <Obj no="3" Type="Block">
19 <Init no="23"/>
20 <BlockRule no="2"/>
21 <Referto no="13"/>
22 </Obj>

23 <Obj no="4" Type="Block">
24 <Init no="24"/>
25 <BlockRule no="3"/>
26 <Referto no="14"/>
27 </Obj>

28 <Obj no="5" Type="Block">
29 <Init no="25"/>
30 <BlockRule no="1"/>
31 <Referto no="15"/>
32 </Obj>
```

```
33 <Obj no="12" Type="Text">
34 <Init no="32"/>
35 <P>
36 TITLE
37 </P>
38 </Obj>

39 <Obj no="13" Type="Image">
40 <Init no="33"/>
41 <Image file="yama.bmp"/>
42 </Obj>

43 <Obj no="14" Type="Text">
44 <Init no="34"/>
45 <P>
46 ARTICLE …
47 </P>
48 </Obj>

49 <Obj no="15" Type="Text">
50 <Init no="35"/>
51 <P>
52 DETAILED ARTICLE …
53 </P>
54 </Obj>
```

| COMMAND NAME | | MEANING |
|---|---|---|
| Obj | | COMMAND DECLARING AN OBJECT |
| | no | COMMAND DECLARING AN OBJECT NUMBER |
| | Type | COMMAND DESGINATING AN OBJECT ATTRIBUTE |
| | | |
| Referto | | COMMAND REFERRING TO ANOTHER OBJECT |
| | no | COMMAND DESIGNATING THE NUMBER OF AN OBJECT TO BE REFERRED TO |
| | | |
| Yspace | | COMMAND MOVING A DRAWING START POINT IN A Y-AXIS DIRECTION |
| | no | COMMAND DESIGNATING A MOVING DISTANCE |
| | | |
| Xspace | | COMMAND MOVING A DRAWING START POINT IN AN X-AXIS DIRECTION |
| | no | COMMAND DESIGNATING A MOVING DISTANCE |
| | | |
| ChangeStart | | COMMAND CHANGING A DRAWING START REFERENCE POINT |
| | no | COMMAND DESINATING A POSITION TO WHICH A DRAWING START REFERENCE POINT IS SHIFTED |
| | | |
| Reset | | COMMAND MOVING A DRAWING START REFERENCE POINT ONTO A Y-AXIS ON WHICH DRAWING CAN BE PERFORMED |
| | | |
| Init | | COMMAND REFERRING TO AN OBJECT INCLUDING INITIAL SETTING INFORMATION |
| | no | COMMAND DESIGNATING THE NUMBER OF A COMMAND TO BE REFERRED TO |
| | | |
| BlockRule | | COMMAND DESIGNATING A NUMBER IDENTIFYING A SHAPE CHANGING RULE |
| | no | COMMAND DESIGNATING A BLOCK SHAPE CHANGING RULE |
| | | |
| P | | COMMAND DRAWING A CHARACTER STRING |
| | | |
| Image | | COMMAND DRAWING AN IMAGE |
| | file | COMMAND DESIGNATING THE FILE OF AN IMAGE TO BE DRAWN |

DEVICE AND METHOD FOR THE MAGNIFICATION OF CONTENT HAVING A PREDETERMINED LAYOUT

BACKGROUND OF THE INVENTION

1. Field of the Invention

The present invention relates to information processing devices and methods, and recording media and programs used therewith, and in particular, to an information processing device and method suitable for use in a device that handles text data and image data, and a recording medium and a program which are used with the device and method.

2. Description of the Related Art

Electronic books containing text data have come into widespread use. In an electronic book, information which is generally recorded in print in a paper book is recorded as text data information. The text data information is displayed by a predetermined terminal device for electronic books in a virtual form in which the information is in a two-page spread state in the case of a paper book. By using the electronic book, pressing a predetermined button slides and displays a one-page image, whereby the image is displayed in a virtual form in which the paper book is opened and each page is turned.

In a terminal device of the related art for electronic books, in order to display an easily readable image, electronic book text data is sequentially divided based on conditions defined in a preset file concerning division, and the divided data in each dividing unit is sequentially displayed on a display section in a range in which it can display a maximum number of characters at one time. An example of such a terminal device is disclosed in Japanese Unexamined Patent Application Publication No. 2002-197088.

The terminal device for electronic books is designed to have a size enabling a user to carry it. Accordingly, there is a limitation in the size of the display section of the terminal device for displaying the text data. The size is not always appropriate for all users. For example, when different terminal devices display identical characters in identical sizes in identical regions, ease of viewing the displayed characters differs depending on the users.

Accordingly, in order that text data may be easily viewed in a limited display region, an invention as disclosed in Japanese Unexamined Patent Application Publication No. 2002-197088 has been proposed. According to Japanese Unexamined Patent Application Publication No. 2002-197088, electronic book text data is sequentially divided based on conditions defined in a preset file concerning division, and the divided data in each dividing unit is sequentially displayed on a display section in a range in which it can display a maximum number of characters at one time. The size of the characters is not always appropriate for users.

For example, users with good eyesight may easily read the characters in the given size, but users with poor eyesight may think that they can easily read the characters in a larger size. In other words, the above invention has a problem in that the characters cannot be displayed in character size matching a user's preference.

Also, display of a maximum number of characters which can be displayed in the display section is reasonably proper for the case of text data composed of only strings of characters. However, the display is not proper for the case of content (e.g., content in which paragraphs should be changed in units of scripts as in a scenario) of one (such as a newspaper or magazine) which includes a still image and which has a feature in its layout in the entirety of the content.

In other words, providing a user with also the layout itself of a still image and text allows the user to enjoy content composed of the still image and text. Also, the intention of the content creator can be respected and this is a preferable state. These problems cannot be solved by methods as disclosed in Japanese Unexamined Patent Application Publication No. 2002-197088, etc.

SUMMARY OF THE INVENTION

The present invention is made in view of the above circumstances, and it is an object of the present invention to provide an information processing device and method in which an image and characters are displayed in a size appropriate for a user, and in which content is displayed in a form reflecting an intention of a copyright owner, such as layout, and to provide a recording medium and a program which are used with the device and method.

According to an aspect of the present invention, an information processing device is provided which includes a storage unit for storing content data of predetermined content, and a display control unit for controlling display of the predetermined content based on the stored content data. The predetermined content is divided into a plurality of blocks to be consecutively displayed, and the content data includes positional data which relates to the blocks and which is for setting a position relatively found from the position of a previous block as the display position of a subsequent block. The display control unit controls the display of the predetermined content by, based on the positional data, sequentially controlling display of one predetermined block in a predetermined position in units of the blocks.

Preferably, the display control unit controls two different screens, and in the display control unit, display of the content based on the content data on one screen is controlled, and display on the other screen of content formed by enlarging the predetermined block in the predetermined content is controlled.

When enlargement is directed for the predetermined block, the display control unit may extract pieces of the content data which relate to the predetermined block for which the enlargement is directed, and may control content based on the pieces of the content data so as to be displayed at a predetermined magnification.

According to another aspect of the present invention, an information processing method is provided which includes a storage control step for controlling storage of content data of predetermined content, and a display control step for controlling, based on the content data in which the storage thereof is controlled in the storage control step, display of the predetermined content. The predetermined content is divided into a plurality of blocks to be consecutively displayed, and the content data includes positional data which relates to the blocks and which is for setting a position relatively found from the position of a previous block as the display position of a subsequent block. In the display control step, the display of the predetermined content is controlled by, based on the positional data, sequentially controlling display of one predetermined block in a predetermined position in units of the blocks.

According to another aspect of the present invention, a recording medium containing a computer-readable program is provided. The program includes a storage control step for controlling storage of content data of predetermined content, and a display control step for controlling, based on the content data in which the storage thereof is controlled in the storage control step, display of the predetermined content. The predetermined content is divided into a plurality of blocks to be consecutively displayed, and the content data includes positional data which relates to the blocks and which is for setting a position relatively found from the position of a previous block as the display position of a subsequent block. In the display control step, the display of the predetermined content is controlled by, based on the positional data, sequentially controlling display of one predetermined block in a predetermined position in units of the blocks.

According to another aspect of the present invention, a program is provided which causes a computer to execute a storage control step for controlling storage of content data of predetermined content, and a display control step for controlling, based on the content data in which the storage thereof is controlled in the storage control step, display of the predetermined content. The predetermined content is divided into a plurality of blocks to be consecutively displayed, and the content data includes positional data which relates to the blocks and which is for setting a position relatively found from the position of a previous block as the display position of a subsequent block. In the display control step, the display of the predetermined content is controlled by, based on the positional data, sequentially controlling display of one predetermined block in a predetermined position in units of the blocks.

According to the present invention, processing such as enlargement can be easily performed on electronic book content.

In addition, according to the present invention, enlargement of only part of content, or the like, can be directed, and the enlargement can be prevented from damaging layout intended by the creator of content.

BRIEF DESCRIPTION OF THE DRAWINGS

FIG. 4 is an illustration of an example of content data;
FIG. 5 is a table illustrating commands in the content data shown in FIG. 4.

DESCRIPTION OF THE PREFERRED EMBODIMENTS

An embodiment of the present invention is described below with reference to the accompanying drawings.

Figure 1:
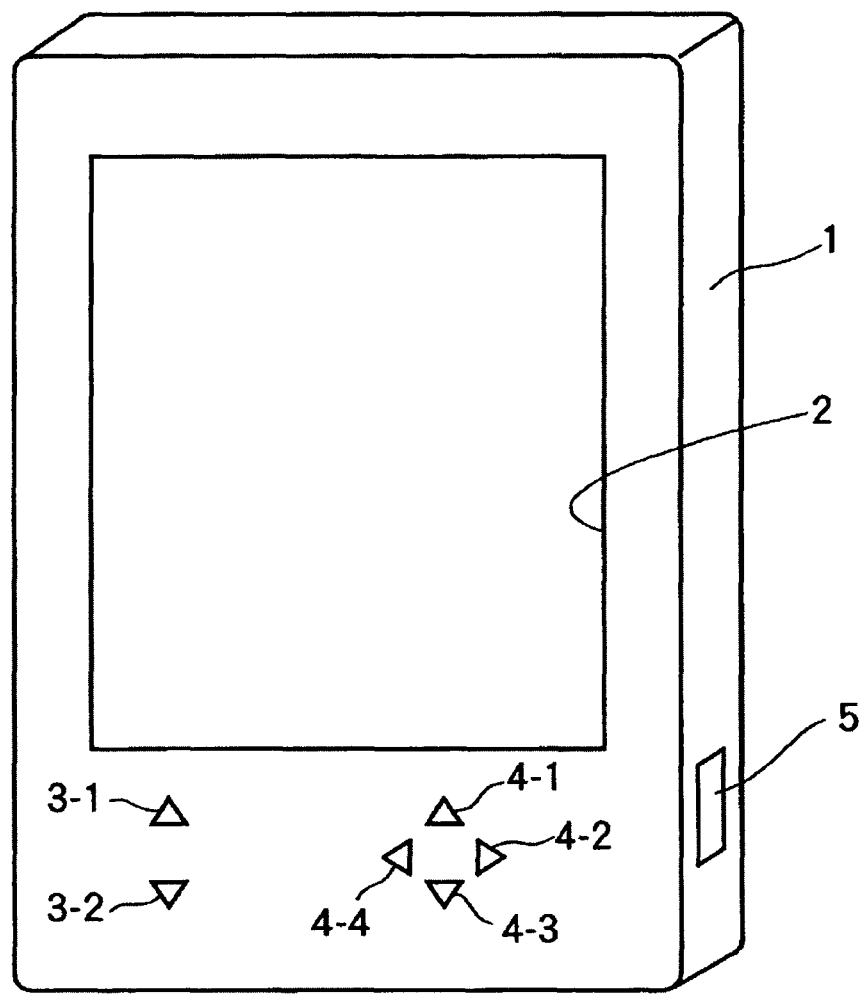
FIG. 1 is a perspective exterior view showing a user terminal 1 according to an embodiment of the present invention.

FIG. 1 is an outside perspective view of a user terminal 1 used as an information processing device according to an embodiment of the present invention. The user terminal 1 includes a display section 2. The display section 2 displays an image and characters.

Below the display section 2, the user terminal 1 includes an enlargement button 3-1 and a reduction button 3-2 which are operated when the image and characters displayed in the display section 2 are changed in size. Also, below the display section 2, the user terminal 1 includes buttons 4-1 to 4-4 for moving a cursor (not shown) displayed in the display section 2 to a desired position. In the following description, when it is not necessary to differently identify the buttons 4-1 to 4-4, the simple representation "button 4" is used. Also, other portions are similarly represented.

The user terminal 1 includes, on one side thereof, a drive 5. The drive 5 can read various types of data.

Although the buttons required for the following description are only shown here, this embodiment is not limited to the exterior shown in FIG. 1. For example, the enlargement button 3-1 and the reduction button 3-2, etc., may be formed by a Jog Dial (trademark) or the like. The position of the drive 5 may be provided in the lower portion, or the like, of the user terminal 1.

This embodiment describes provision of the button 4 and the use of the button 4 to operate the cursor. However, for example, a touch pen or the like is provided, and instead of moving the cursor, by using the touch pen, an image, or the like, displayed in the display section 2 may be selected, and the cursor may be operated by using an externally connected mouse or the like.

Although the user terminal 1 in FIG. 1 includes no communication unit for exchanging data with another device, the user terminal 1 can download electronic book data through a network such as the Internet, and includes a communication unit for performing communication for the download.

Figure 2:
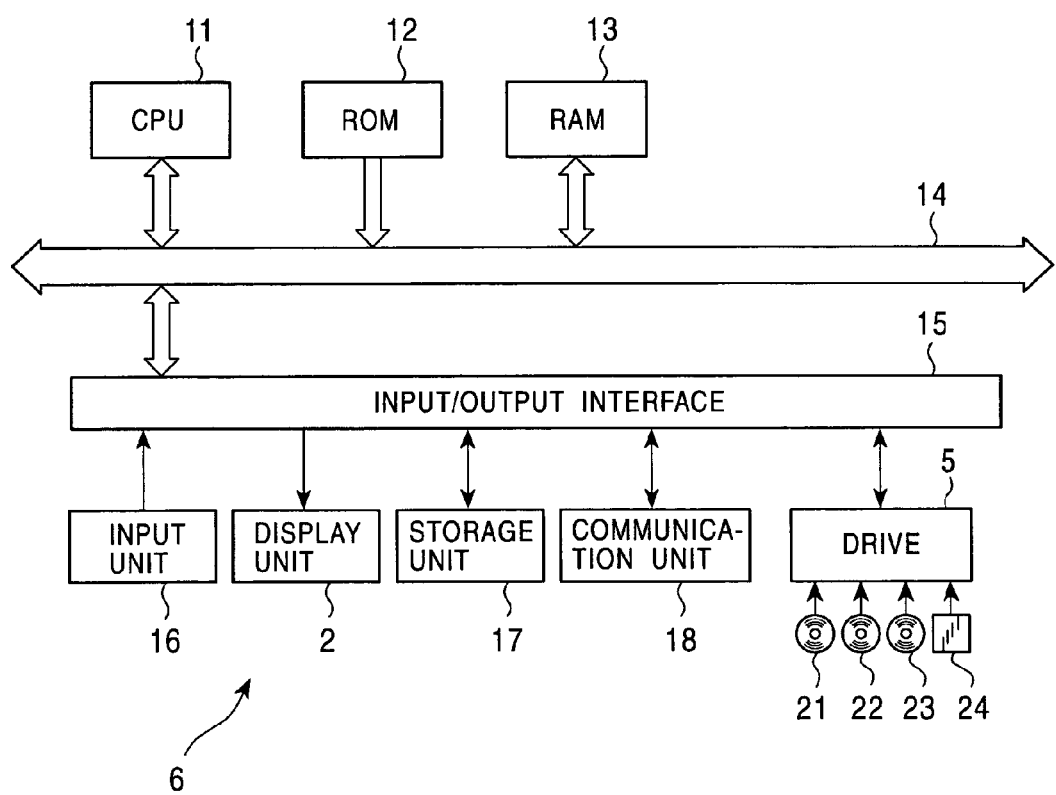
FIG. 2 is a block diagram showing the internal structure of the user terminal 1 shown in FIG. 1.

FIG. 2 is a block diagram showing an internal configuration of the user terminal 1. In the display section 2, a central processing unit (CPU) 11 executes various processes in accordance with programs stored in a read-only memory (ROM) 12. A random access memory (RAM) 13 stores the data and programs required for the CPU 11 to execute the various programs, as required. An input/output interface 15 connects to an input unit 16 including the enlargement button 3-1, the reduction button 3-2, and the buttons 4-1 to 4-4, and outputs, to the CPU 11, a signal input from the input unit 16.

The input/output interface 15 also connects to the display section 2. The input/output interface 15 connects to a storage unit 17 including a hard disk drive, and a communication unit 18 for sending/receiving data to/from another device through a network such as the Internet. The drive 5 is used to read or write data on a recording medium such as a magnetic disk 21, an optical disk 22, a magneto-optical disk 23, or a semiconductor memory 24.

Data which is provided from another device and is received by the communication unit 18 is stored in the storage unit 17, and an image and text based on the stored data are displayed in the display section 2. Alternatively, data which is recorded on the recording medium, such as the magnetic disk 21, the optical disk 22, the magneto-optical disk 23, or the semiconductor memory 24, in a state loaded into the drive 5, is read, and an image and text based on the read data is displayed in the display section 2. In the following description, the image and text displayed in the display section 2 are referred to as "content", and data concerning the content is referred to as "content data".

Figure 3:
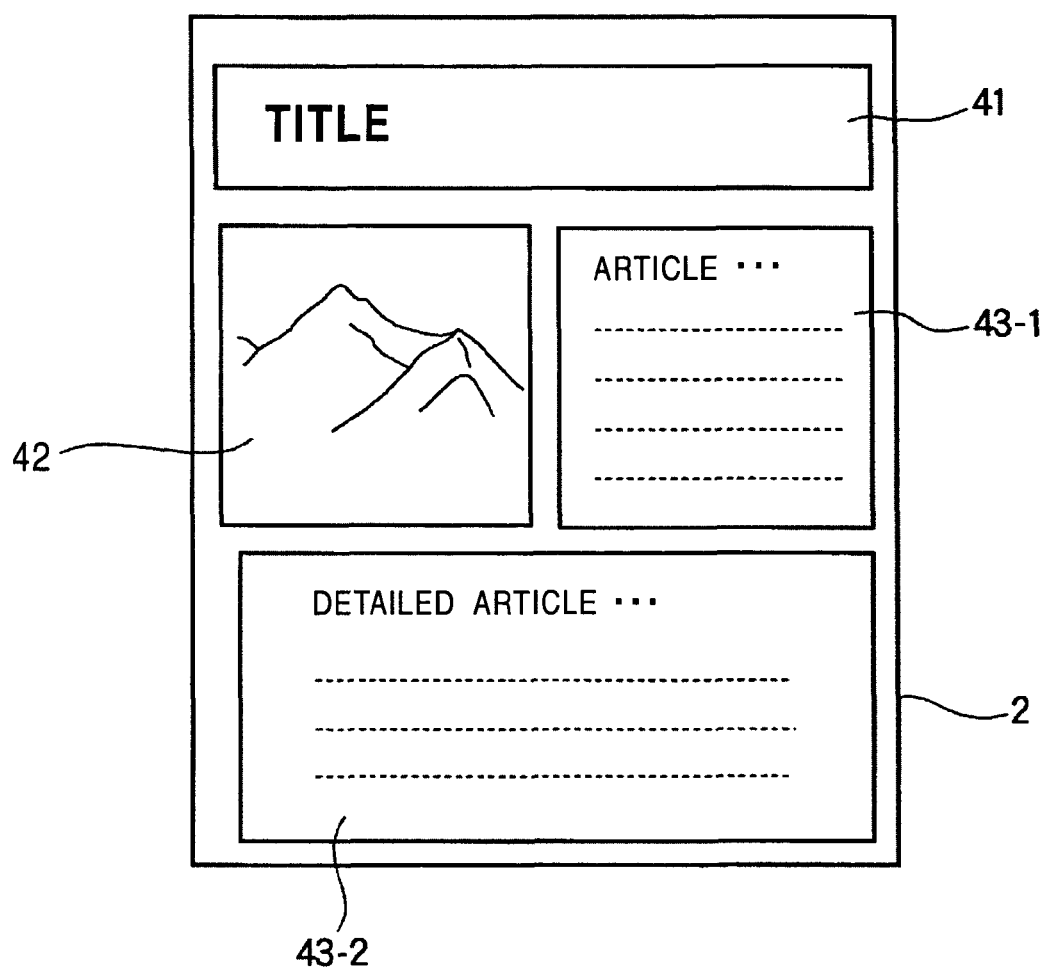
FIG. 3 is an example of a screen displayed in the display section 2 shown in FIG. 1.

FIG. 3 shows an example of content displayed in the display section 2. In the example in FIG. 3, a title display block 41 is shown in which the title of the content is displayed. Below the title display block 41, an image display block 42 in which an image is displayed is shown on the left side, and a text display block 43-1 in which text is displayed is shown on the right side.

In the lower portion of the display section 2, a text display block 43-2 in which text is displayed is shown. In the following description, the title display block 41, the image display block 42, and the text display blocks 43-1 and 43-2 are collectively referred to as the "blocks", if needed.

The content displayed in the display section 2 in FIG. 3 is only one example, and does not indicate any limitation. In other words, a layout or the like may be changed depending on content. For convenience of description, for example, the title display block 41 in which the title is displayed is shown. However, for content having no title, the title display block 41 is not displayed. Even if a title is displayed, the display position is not limited to the top side of the display section 2.

In addition, the display blocks 41 to 43 are not regions preset in the display section 2. In other words, for example, a block called the title display block 41 is not preset and is added for description. As described above, the positions and contents of the above blocks are determined based on the data, etc., stored in the storage unit 17 and the recording medium.

Accordingly, for example, when novel-like content is displayed, only text is displayed in the display section 2. In such a case, the text display block 43 is provided in the display section 2 (note: a block called the text display block 43 is not set as data but is so named and set for convenience of description), and in the text display block 43 provided (reserved as a region), the text is displayed.

FIG. 4 is an illustration of an example of content data for displaying the content shown in FIG. 3 in the display section 2. FIG. 5 is a table illustrating the meanings of commands in the content data 51 shown in FIG. 4, and is referred to for description, if needed. In the content data 51 in FIG. 4, line numbers indicated on the left column do not need to be added to actual content data since the line numbers are added for description.

In line 1 of the content data 51, the command "Obj" to declare an object is written. For this command, the command "Type" to designate an object attribute (type) is used in the form of a pair. In line 1, a command representing the start of data for displaying the content shown in FIG. 3, that is, a command representing the start of data for displaying one page as shown in FIG. 3, is written. It is written in line 1 that the object number is "1" and the attribute is "Page".

The command "Referto" in line 2 is used to describe an object number to be referred to. Line 2 in FIG. 4 writes that object number 2 is referred to. An object corresponding to object number 2 is written in lines 13 to 17. As is written in line 13, it is declared that the type of the object is "Block"

In this embodiment, processes such as enlargement and reduction are performed in units of blocks. Here, a block represents the size of a display region when it is displayed in the display section 2. Initial setting information concerning the block is written in an object number written as "Init" in line 14. Line 14 shows that the initial setting information is written in an object (not shown) corresponding to object number 22.

In line 15, a block rule (indicated by "BlockRule") is declared. In this "BlockRule", it is defined that, when enlargement or reduction is directed for the block, how the enlargement or reduction is realized. Block rules are described with reference to FIGS. 6A to 6C, and 7A to 7C. Although the following description exemplifies an enlargement case, in a reduction case, an inverse process may only be performed and similar rules can be used.

Figure 6A:
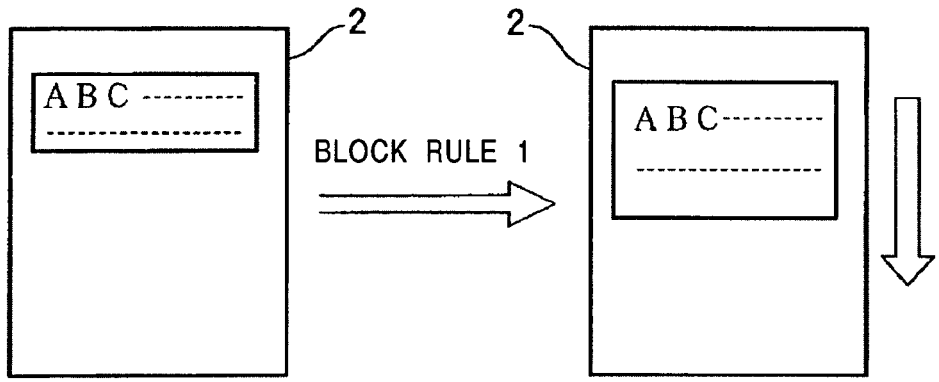
FIGS. 6A, 6B, and 6C are illustrations of block rules.
Figure 6B:
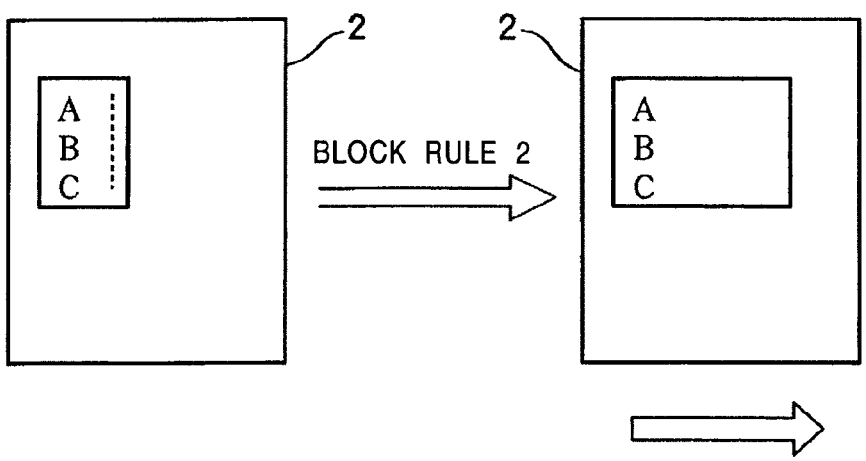

FIG. 6A illustrates block rule 1. Block rule 1 is mainly applied to horizontally written text. In block rule 1, when enlargement is directed, the block of the text is vertically enlarged, with the width of the original block maintained. FIG. 6B illustrates block rule 2. Block rule 2 is mainly applied to vertically written text. In block rule 2, when enlargement is directed, the block of the text is horizontally enlarged, with the length of the original block maintained.

Figure 6C:
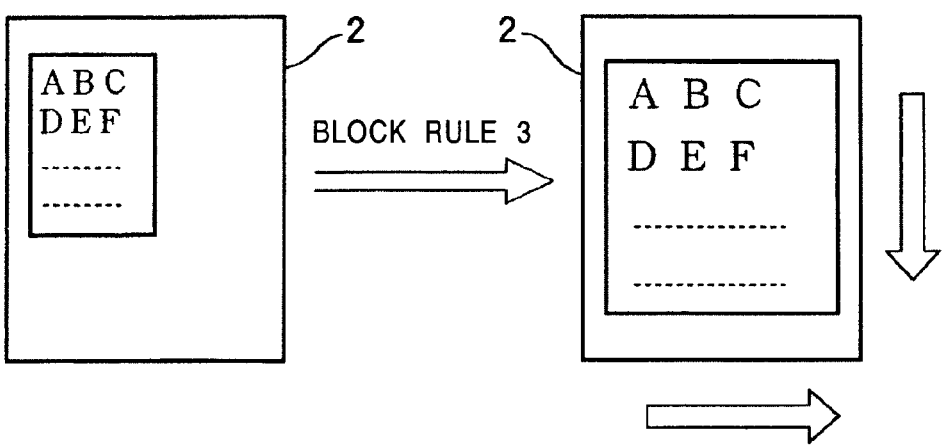

FIG. 6C illustrates block rule 3. Block rule 3 is mainly applied to horizontally written text. In block rule 3, when enlargement is directed, at first, the length of the block of the text is vertically enlarged, and when it is determined that the enlarged block does not fall within a possible drawing region (in the display region of the display section 2, a region which can be occupied by the block from a relationship of adjacent blocks, etc., and which is calculated in a process described later), the block is also horizontally enlarged.

Figure 7A:
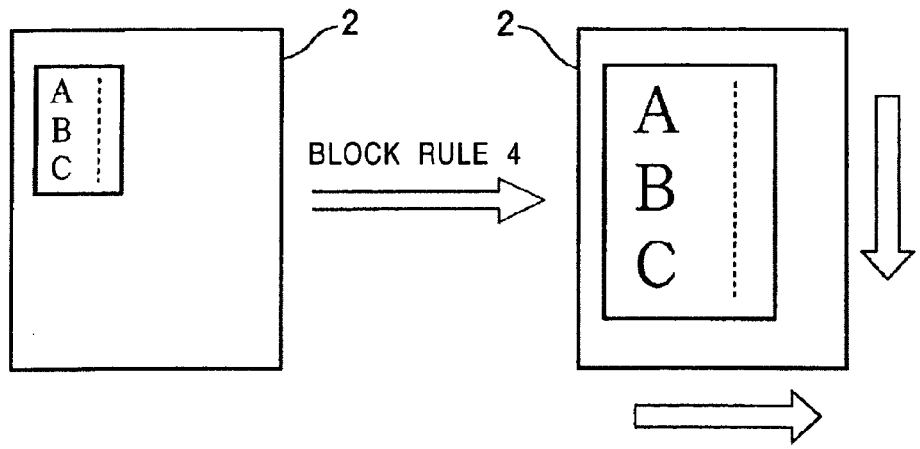
FIGS. 7A, 7B, and 7C are illustrations of block rules.

FIG. 7A illustrates block rule 4. Block rule 4 is mainly applied to vertically written text. In block rule 4, when enlargement is directed, at first, the block of the text is horizontally enlarged, and when it is determined that the enlarged block does not fall within the possible drawing region, the block is also vertically enlarged.

Figure 7B:
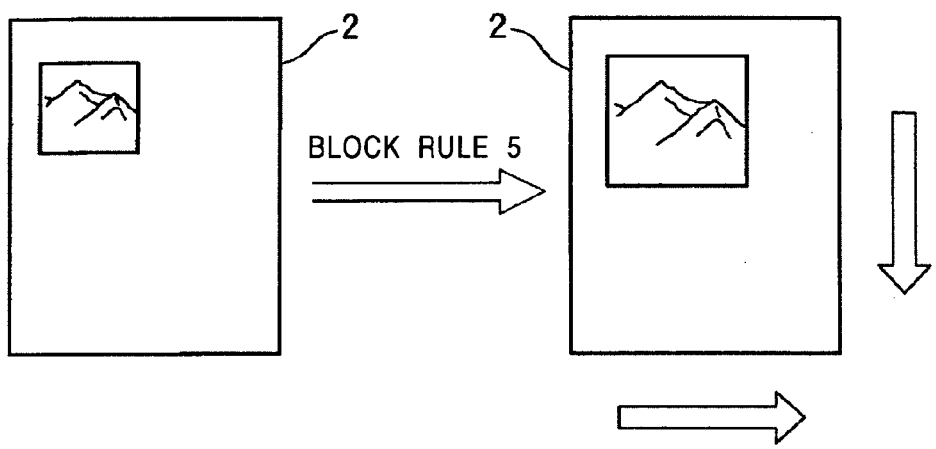
Figure 7C:
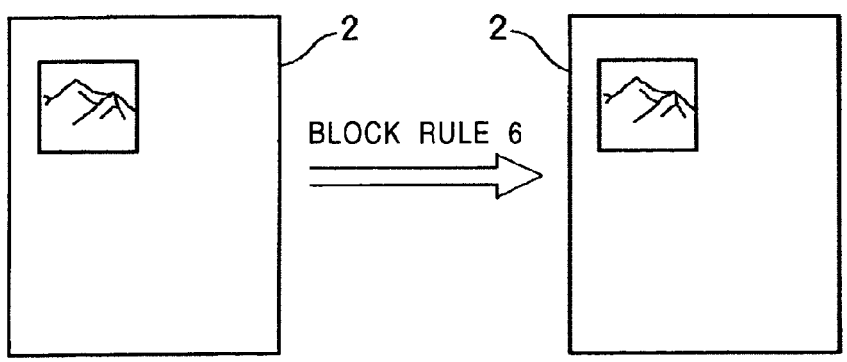

FIG. 7B illustrates block rule 5. Block rule 5 is mainly applied to an image. When enlargement is directed, the image is vertically and horizontally enlarged in equal ratios. FIG. 7C illustrates block rule 6. Block rule 6 is mainly applied to an image. In block rule 6, even if enlargement is directed, the size of the image is not changed. As described above, by applying block rule 5 or 6, the enlargement can be prevented from generating an image which is not intended by the content creator, such as a state in which a distortion appears.

Referring back to the description of the content data 51 in FIG. 4, the block rule defined in line 15 is information which is used when enlargement is directed. Thus, this is ignored when the content in FIG. 3 is displayed. Next, in line 16, it is declared that object number 12 is referred to.

An object corresponding to object number 12 is written in lines 33 to 38. In line 33, it is declared that the attribute of the object is text (indicated by "Text"), and the content of the text is written in line 36. Objects are sequentially processed up to object number 12 in the above flow, whereby the title display block 41 in FIG. 3 is processed.

In lines 33 to 38, an object (indicated by "Referto") which is referred to is not shown. Steps are sequentially performed from line 33, and in line 38, the end of the object corresponding to object number 12 is declared. In the case of the declaration of the end, the process is returned to a previous object, in this case, the object corresponding to object number 2.

In the object corresponding to object number 2, the process has ended up to line 16, and in line 17, the end of the object corresponding to object number 2 is declared. Thus, the process is returned to the object corresponding to object number 1, that is, an object processed before the object corresponding to object number 2 is processed.

Figure 8:
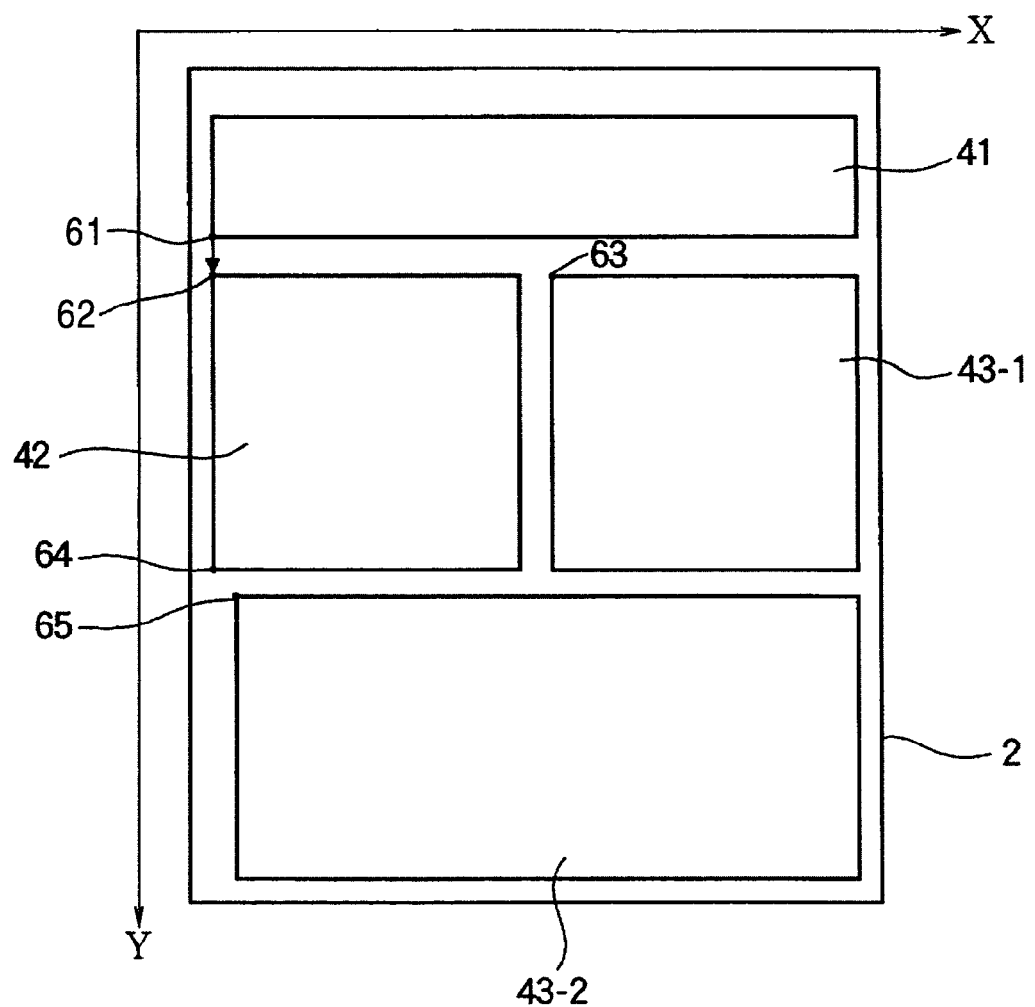
FIG. 8 is an illustration of the arrangement of blocks.

In the object corresponding to object number 1, the process has ended up to line 2, and starts in line 3. In line 3, a command (indicated by "Yspace") for moving the start point of drawing in the next block in a Y-direction (as FIG. 8 shows, the Y-axis direction is a vertical direction and its top end is the origin (point zero) of the Y-axis) is written. The command "Yspace" defines shifting of the start point of the next block by a value set in "Yspace" in the Y-direction from the end point of the Y-direction of the previous block.

Referring to FIG. 8, when the end point 61 in the Y-axis direction of the title display block 41 is in the position indicated in FIG. 8, based on the command "<Y-space no="20"/>" in line 3, a point which shifts by 20 in the Y-axis direction from the end point 61 is used as a start point 62 at which drawing in the next block (the image display block 42 in this case) is started. Regarding the representation that the point which shifts by 20 in the Y-axis direction, the units are, for example, 20 dots, 20 milli- or centi-meters, or the like. Units which are determined in the design phase, as required, may be used.

Although the start point 62 is defined only in the Y-axis direction as a relative position with the previous block, a position only in the X-axis direction may be defined, and points both in X-axis and Y-axis directions may be defined. For example, in line 6 in FIG. 4, a position only in the X-axis direction is defined. Similarly to "Yspace", "Xspace" is also a command to move the start point of drawing in a new block, and defines shifting of the start point of the next block by a value set in "Xspace" in the X-axis direction from the end point in the X-axis direction of the previous block. The X-axis direction is the horizontal direction in FIG. 8, and the left end point of the direction is set as the origin (point zero).

The start point of drawing in a block is further described. In line 5, in the code "<ChangeStart no="3"/>", "ChangeStart" is a command to direct changing a drawing start reference point. The changing of the drawing start reference point indicates that the drawing start point of a position in which an object (in this case the attribute of a designated object is a block) corresponding to a designated object number is drawn is set as a reference point for a position in which a new block is drawn.

In the case of FIG. 8, the object number designated by "ChangeStart" is "3", and the drawing start point of the object corresponding to object number 3 is a start point 62. The start point 62 is set as a reference point for determining the drawing start point of a new block, in this case, the text display block 43-1. In line 6 (FIG. 4), it is written that a point shifted by 5 in the X-axis direction from the reference point is set as a drawing start point 63 for the text display block 43-1.

In line 8 (FIG. 4), the command <Reset/> is used to move a drawing start reference point to a position on a Y-axis on which drawing can be performed. Referring to FIG. 8, the title display block 41, the image display block 42, and the text display block 43-1 have already been displayed. Accordingly, in a part other than these blocks, that is, the part below the image display block 42 is a possible drawing region.

As shown in FIG. 8, the position on the Y-axis on which drawing can be performed is a point abutting in the Y-axis direction on a point 63 at a bottom end of the image display block 42. The abutting point is used as a drawing start reference point. The commands in lines 9 and 10 (FIG. 4) set, based on the drawing start reference point, the drawing start point 65 of the text display block 43-2.

As described above, in this embodiment, block-unit processing is performed, and a display position in which each block is displayed is defined by a relative position from the previous block. Such determination of the display position by the relative position from the previous block is that, among the blocks, the order of displaying each block is determined. In other words, if the previous block is not displayed, a subsequent block whose display position can be relatively found from the display position of the previous block is not displayed. Thus, this results in the block display order.

Definition of the block display order is that, a user is provided with content, the order the user reads the content is also defined (it is commonly assumed that the user reads from top down and from left to right). Accordingly, even if layout is changed by performing a process such as enlargement, the block display order does not change. This results in no change in the order the user reads content.

Implementation of the process in accordance with the content data 51 in FIG. 4 displays the content shown in FIG. 3. In this case, the display order is the order of the title display block 41, the image display block 42, the text display block 43-1, and the text display block 43-2.

The commands in the lines of the content data 51 in FIG. 4 are sequentially executed, whereby the content in FIG. 3 is displayed in the display section 2.

Figure 9:
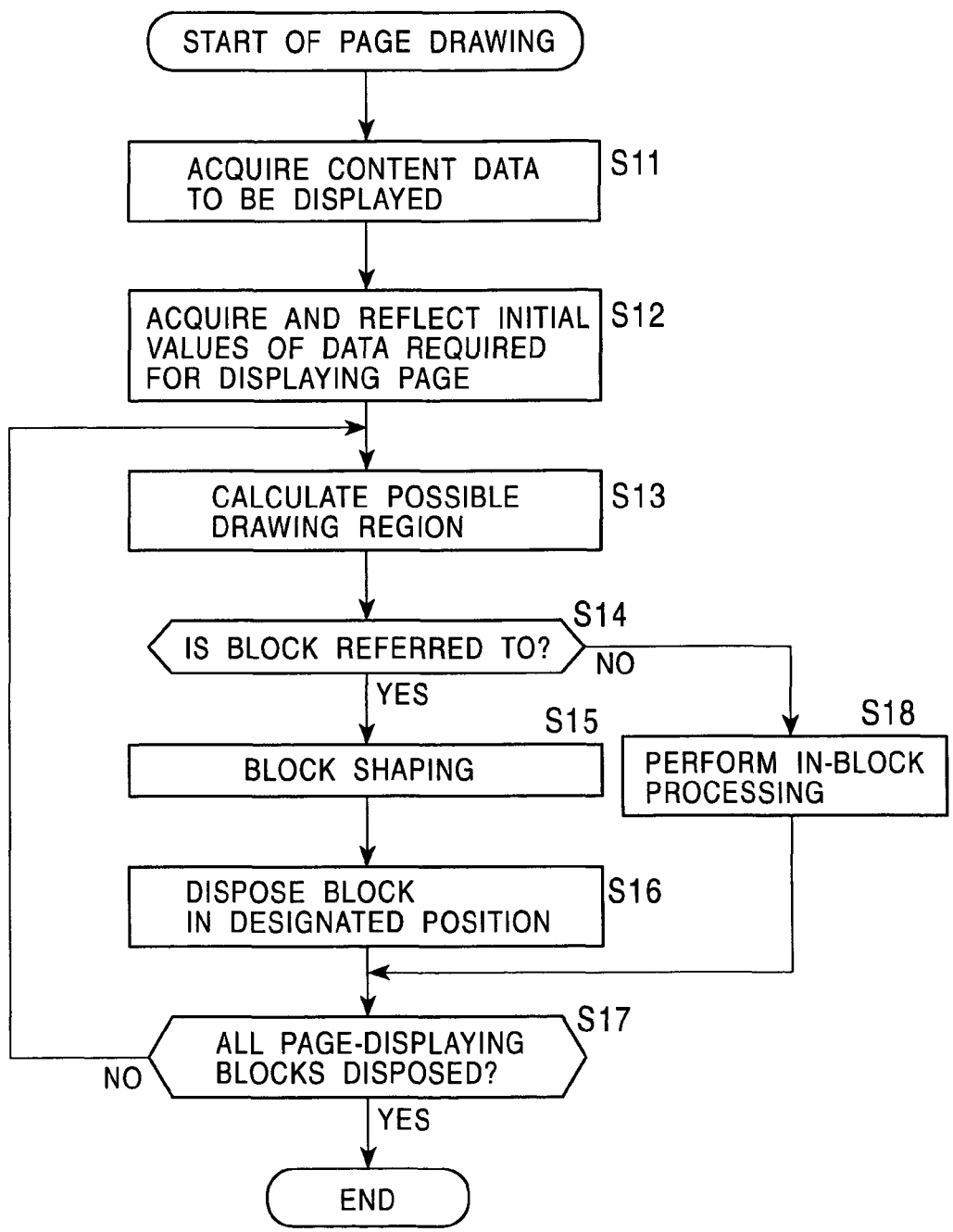
FIG. 9 is a flowchart illustrating a page drawing process for displaying a page in the display section 2 in FIG. 1.

Next, a process that the user terminal 1 performs for displaying the content shown in FIG. 3 in the display section 2 is described with reference to the flowchart shown in FIG. 9.

In step S11, the content data 51 of the content to be displayed in the display section 2 is acquired. The acquisition may be performed, for example, such that the content is supplied from another device through the communication unit 18, or the content is supplied from a recording medium loaded into the drive 5.

Based on the content data 51 acquired in step S11, step S12 and subsequent steps are performed.

In step S12, the initial values required for displaying a page are acquired and reflected. The initial values acquired in step S12 consist of values representing a page background color, information on whether text is vertically or horizontally written, information on whether the page includes a header, a footer, and margins, and information on their sizes if they are included.

Figure 10:
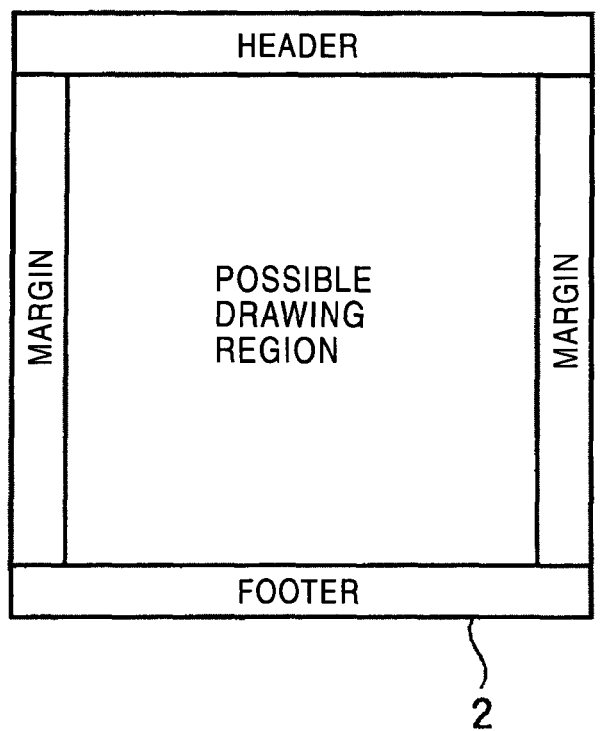
FIG. 10 is an illustration of a header, a footer, and margins.

In step S13, a possible drawing region is calculated. The possible drawing region is described with reference to FIG. 10. When the fields of the header, the footer, and the margins are set as shown in FIG. 10 by the initial values acquired in step S12, the part of the page excluding the above fields is used as the possible drawing region. In the possible drawing region, content such as an image and text is displayed.

Also, when enlargement is directed, only the image or text displayed in the possible drawing region is enlarged. In other words, even if enlargement is directed, the size of the image or text is maintained without enlarging the header, the footer, and the margins.

In step S14, it is determined whether or not a block is referred to.

This determination is performed by using the content data 51. Referring to the content data 51 in FIG. 4, when a command which is being processed is, for example, <Obj no="2" Type="Block"> in which "Type" is "Block", it is determined in step S14 that the block is being referred to.

When it is determined in step S14 that the block is being referred to, the process proceeds to step S15, and block shaping is executed. The block shaping is performed, as indicated by, for example, <Init no="22"/>, in accordance with an object corresponding to an object number designated by "Init".

Specifically, the block shaping is performed by determining the Y-axis and X-axis dimensions of the block. After the block shaping ends, the process proceeds to step S16, and the block is disposed in the designated position. As described with reference to FIG. 8, step S16 is performed in accordance with the commands "Xspace", "Yspace", "ChangeStart", and "Reset".

After implementation of the above steps ends, in step S17, it is determined whether or not all the blocks required for displaying the page have been disposed. This determination is performed such that, in the content data 51 in FIG. 4, it is determined whether or not processing on the object (object in which "Type" is "Page") corresponding to object number 1 has ended.

In step S17, when it is determined that all the blocks required for displaying the page have not been disposed yet, the process returns to step S13. Then, step 13 and the subsequent steps are performed on the next block, and step 13 and the subsequent steps are repeatedly performed. When it is determined that all the blocks required for displaying the page have been disposed, the page drawing process shown in FIG. 9 ends.

Also, in step S14, when it is determined that the block is not being referred to, the process proceeds to step S18. No reference to the block means an object in which "Type" is not "Block" in the content data 51 in FIG. 4. This is regarded as, for example, a case in which "Type" is "Text" as in line 33.

In such a case, what is indicated by the content displayed in the block, such as an image or block, is processed. Accordingly, in step S18, the object is processed based on the attribute declared by the "Type".

The content in FIG. 3 is displayed in the display section 2 such that the content data 51 in FIG. 4 is processed as described above.

When the content in FIG. 3 is displayed in the display section 2, the user does not always think that the content is easily viewable (readable). By way of example, a title and still images are easily viewable, but text such as an article is difficult to view since it consists of small characters. Also, the user may need to control the display section 2 to display a predetermined portion. For example, there may be a case in which the text of an article displayed in the text display block 43-1 is displayed in enlarged form in the display section 2.

When desiring to enlarge the portion of the content, the user operates the enlargement button 3-1. Operating the enlargement button 3-1 displays the user-designated block in an enlarged form. The user-designated block is, for example, a block selected such that the user operates the buttons 4-1 to 4-4 (FIG. 1) to move the cursor (a block on which the cursor is positioned is displayed to be distinguishable from the other blocks) movable among blocks.

A process that is performed by the user terminal 1 when a predetermined block is selected and enlarged display is directed is described below with reference to the flowchart shown in FIG. 11.

In step S31, when enlargement of a block is directed by the user, the block is identified. After the enlargement button 3-1 in the input unit 16 (FIG. 2) is operated, information of the operation is sent to the CPU 11. At the time the CPU 11 acquires the information, it identifies a block on which the cursor (not shown) is positioned.

An object concerning the specified block is acquired in step S32. In this case, an object in which the "Type" corresponding to the specified block is "Block", and an object in which the object is referred to by "Referto" are acquired.

For example, when the block for which enlargement is directed is identified as the title display block 41 (FIG. 3), in the content data 51 in FIG. 4, an object represented in lines 13 to 17 and an object in lines 33 to 38 to which the object refers are acquired in step S32.

In step S33, displaying initial values are changed to match enlarged display. This step is performed in accordance with rules preset in a viewer for displaying content by the user terminal 1. For example, the rules include those in which "a character displayed in 30 points is not further enlarged", and "a character displayed in 20 points is enlarged to 25 points, and is further enlarged to 30 points when more enlargement is directed".

The above rules are acquired in step S33, and based on the acquired rules, an enlargement size is determined. Regarding the enlargement size, the size of a block and the size (e.g., the size of characters when content is text composed of the characters) of content displayed in the block are determined. When the block size is determined, the block rules (indicated by "BlockRules") are referred to. The block rules are those for use in the case of enlarging a block.

Based on the size determined as described above, in step S34, an image or characters are drawn in an enlarged display region. In other words, in step S34, processing is executed in which content based on the object acquired in step S32 is displayed in the size determined in step S33.

Figure 12:
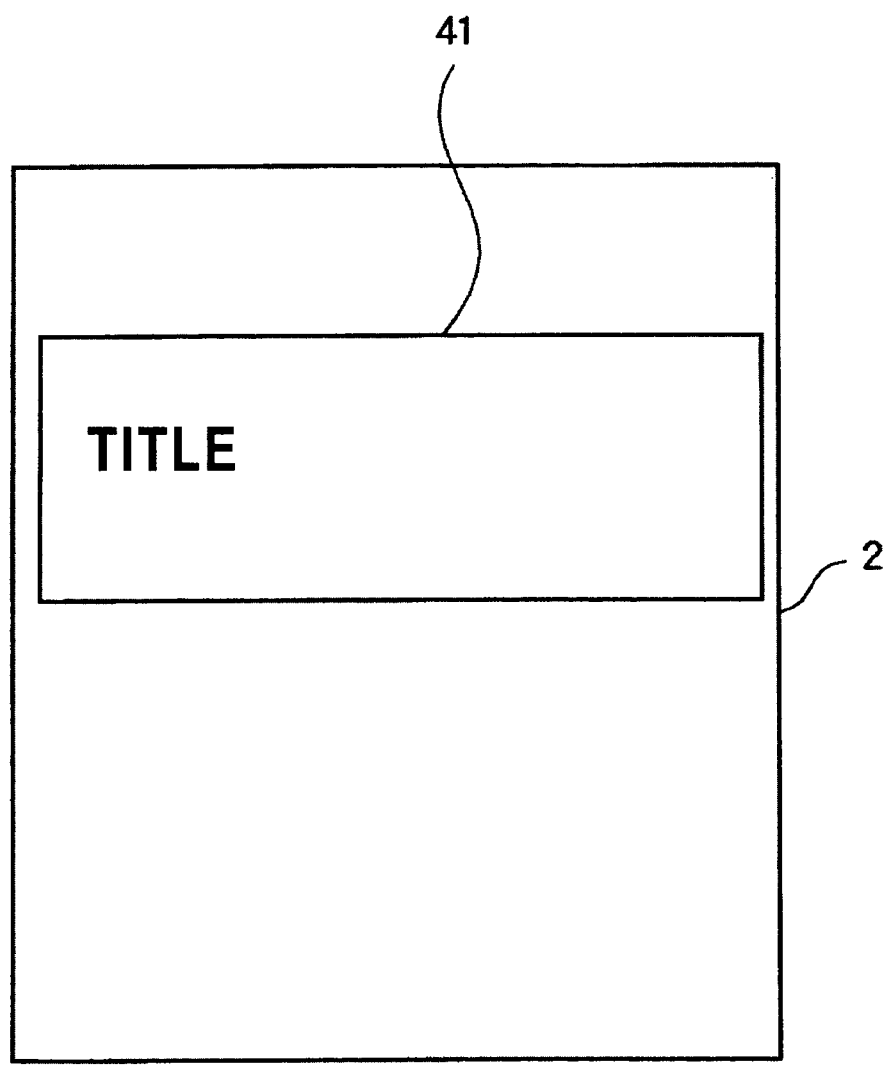
FIG. 12 is an illustration of an enlarged display form.

When the content in FIG. 3 is displayed, enlarged display on the title display block 41 is directed by the user, and the above processing is executed, whereby, as FIG. 12 shows, the title display block 41 is displayed in enlarged form in the display section 2.

Figure 11:
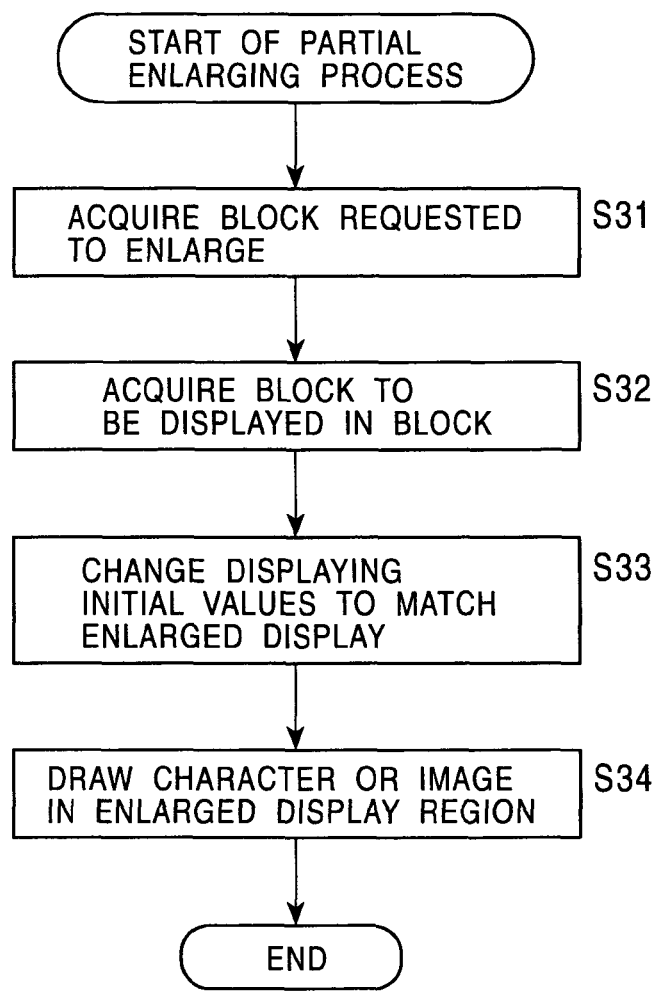
FIG. 11 is a flowchart illustrating a partial enlarging process.

When the enlargement button 3-1 is further operated in the display state shown in FIG. 12, re-execution of the process in the flowchart in FIG. 11 may display more enlarged content. When the reduction button 3-2 is operated in the display state shown in FIG. 12, the display state may return to that shown in FIG. 3.

As described above, enlargement on one block is directed, the one block is displayed in enlarged form. Thus, the user can easily enlarge a desired block to a size in which content is easily viewable. The reason that this type of processing is easily performed is that the processing is executed in units of blocks. The block-unit processing facilitates processes such as extraction or enlargement of a desired portion of content.

Although the user issues a direction to enlarge one block and the one block can be displayed in enlarged form, when enlarged display is directed without designating a block, the entirety (blocks) of content (page) may be displayed in enlarged form.

Figure 13:
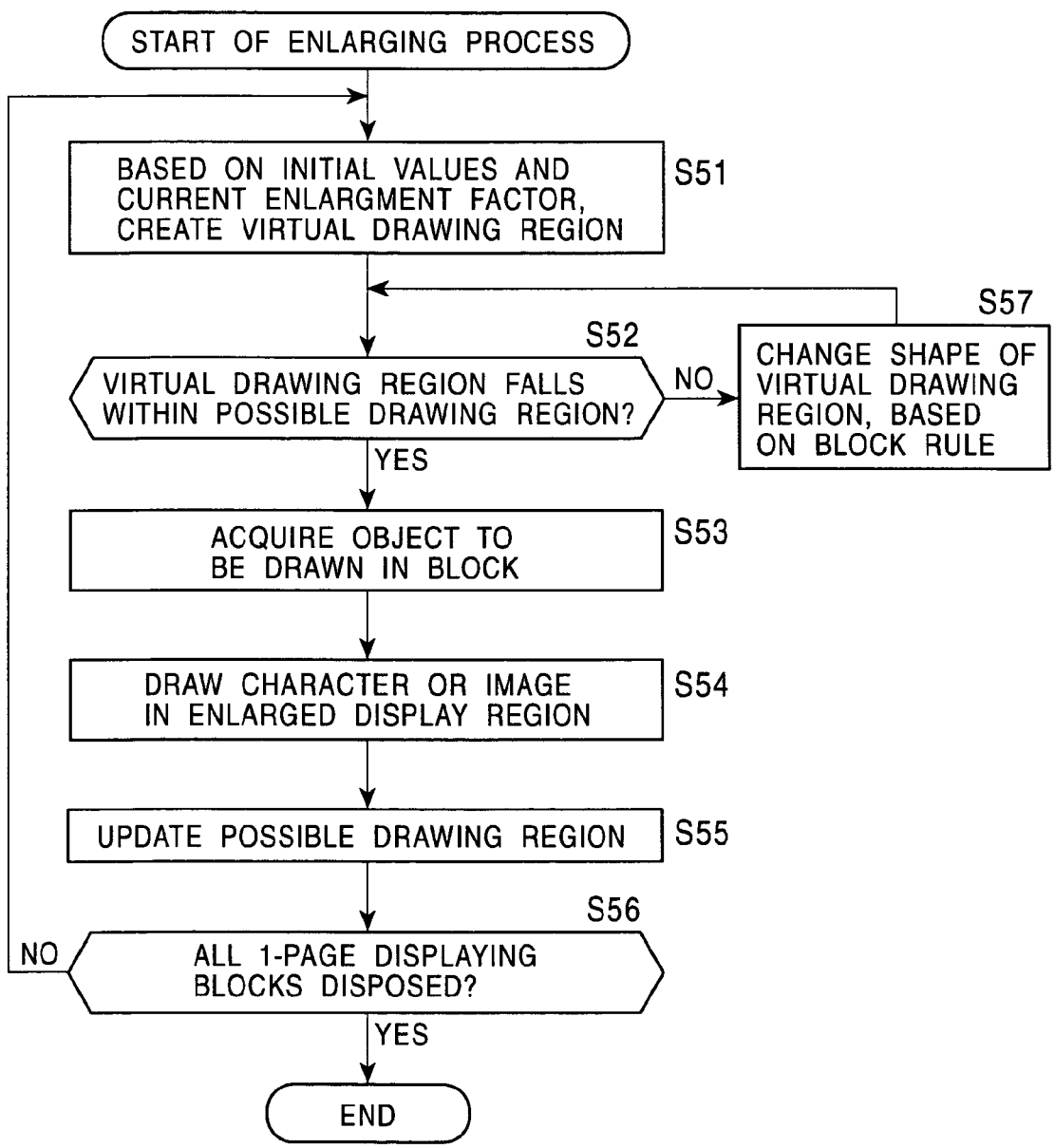
FIG. 13 is a flowchart illustrating a process for enlarging the entirety of a page.

When the entirety of content is enlarged, a process in accordance with the flowchart shown in FIG. 13 is performed. In this process, it is assumed that enlargement is directed on the content shown in FIG. 3.

When enlargement is directed on the content in FIG. 3, the process in FIG. 13 is executed in the order of the title display block 41, the image display block 42, the text display block 43-1, and the text display block 43-2, whereby each block is displayed in enlarged form.

In step S51, a virtual drawing region is created based on initial values, and an enlargement factor at the time enlargement is directed. The initial values are similar to those obtained in step S33 in the flowchart in FIG. 11, and depend on the viewer. The enlargement factor includes, for example, 1.5 times and 2 times, and is a ratio obtained when an enlargement factor used when the time counter 51 is initially processed is 1.

The virtual drawing region is the size of a block to be processed which is created based on the initial values and the enlargement factor. The virtual drawing region is not the size of a block finally displayed in the display section 2, but a virtual region which is created in order to determine whether or not, in a subsequent state, the display section 2 can actually perform displaying in the virtual drawing region.

In step S52, it is determined whether or not the virtual drawing region falls within the possible drawing region. The possible drawing region is part of the display region of the display section 2 excluding a portion in which a block has already been disposed. A case in which it is determined in step S52 that the virtual drawing region does not fall within the possible drawing region is, for example, a case in which it is determined that the state shown in FIG. 14 occurs. That is, the determination is performed when a portion of the virtual drawing region runs over the display section 2.

In step S52, when it is determined that the virtual drawing region falls within the possible drawing region, that is, when it is determined that the block being processed can be displayed in the set size without running over the display section 2, the process proceeds to step S53. In step S53, an object to be drawn in the block is acquired.

In step S54, in an enlarged display region (the set virtual drawing region), an image or characters based on the acquired object are drawn. Basically, steps S53 and S54 are almost identical to those in the flowchart in FIG. 11.

In step S55, the possible drawing region is updated. Since the steps up to step S54 are performed to add a new block, the possible drawing region is reduced by the added block. Thus, by subtracting the added block from the possible drawing region, the possible drawing region is updated.

After the above steps ends, in step S56, it is determined whether or not all the blocks required for displaying one page have been disposed. When it is determined that the blocks have been disposed, the enlarging process shown in FIG. 13 is terminated. When it is determined that the blocks have not been disposed yet, the process returns to step S51, and similar processing is repeatedly performed on a new block.

Also, when it is determined in step S52 that the virtual drawing region does not fall within the possible drawing region, the process proceeds to step S57. In step S57, based on the block rules, the shape of the virtual drawing region is changed. Step S52 and the subsequent steps are executed again for the shape-changed virtual drawing region, and the enlarging process is performed so as to prevent the appearance of a block in which even a portion thereof runs over the display section 2.

Figure 15:
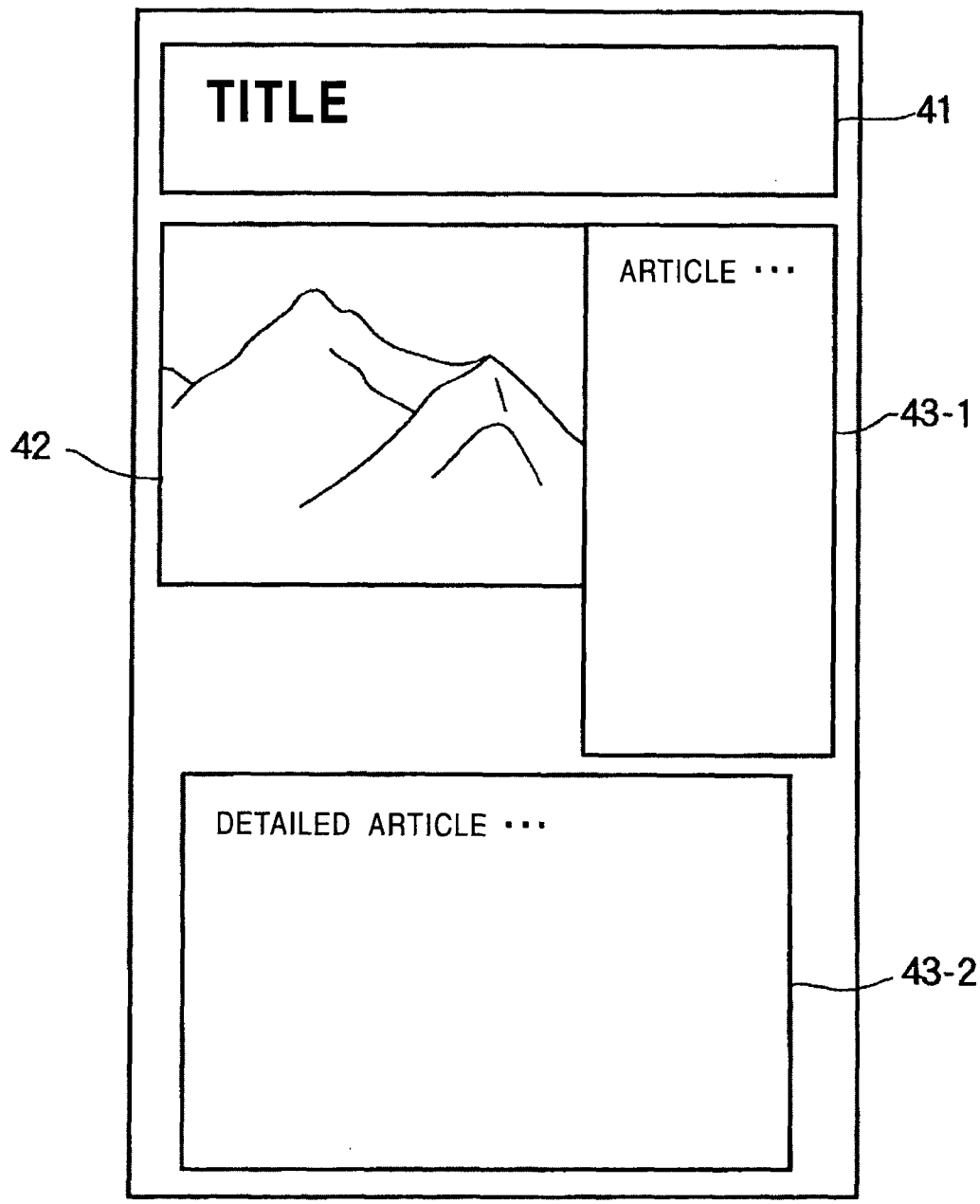
FIG. 15 is an illustration of the display state of enlarged content.
Figure 16:
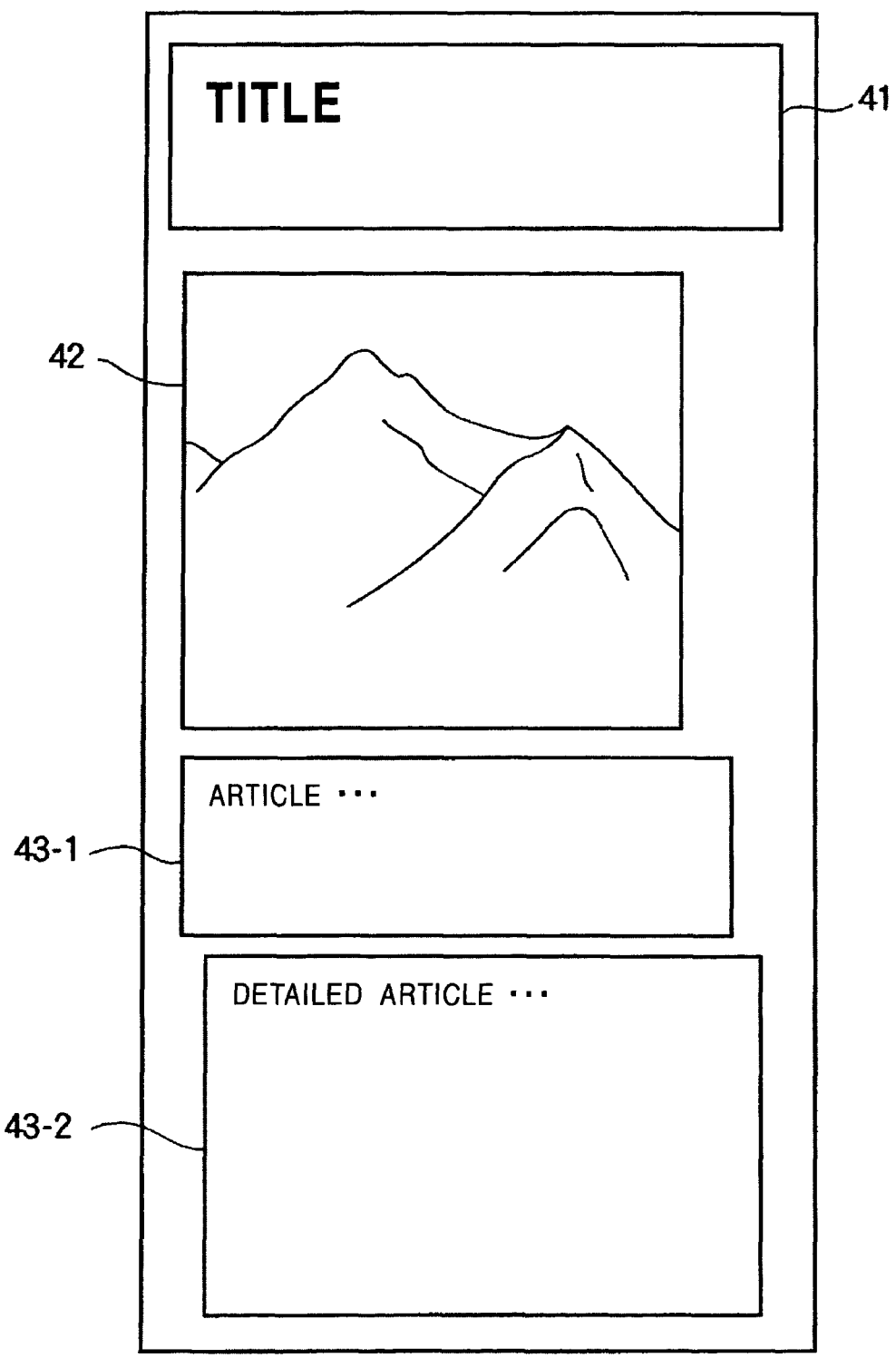
FIG. 16 is an illustration of the display state of enlarged content.

Examples of displayed content obtained by the enlarging process are shown in FIGS. 15 and 16. The examples shown in FIGS. 15 and 16 differ from actual screens displayed in the display section 2. Specifically, the example in FIG. 15 or 16 shows the case of enlarging the example of content shown in FIG. 3.

In the example of content shown in FIG. 3, the content is displayed in a region having a size almost identical to that of the displayable region of the display section 2. In the case of performing the enlarging process on the displayed page from that state, the enlarged page cannot be displayed within the display section 2. Accordingly, the example of content in FIG. 15 or 16 shows a case in which one virtual page is displayed in a virtual display region. What is actually displayed in the display section 2 is part of the content. The other part that cannot be displayed in the display section 2 can be viewed by an operation such as scrolling.

Figure 14:
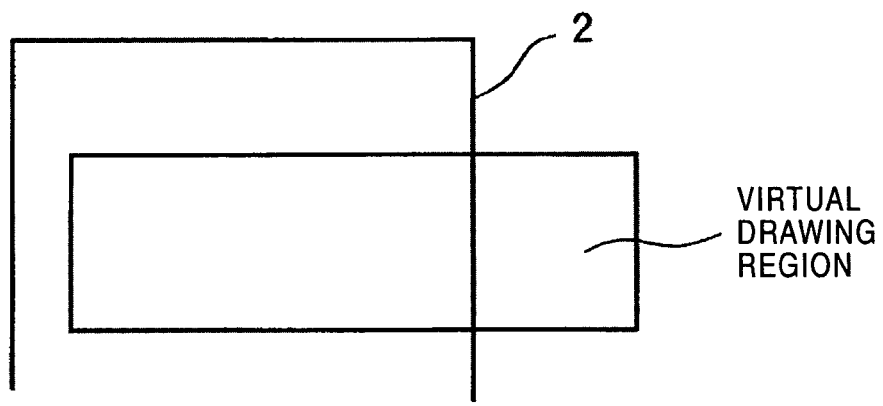
FIG. 14 is an illustration of a virtual drawing region.

As described above with reference to the flowchart in FIG. 13, as shown in FIG. 14, the process is performed so that a portion of the block cannot run over the display section 2. The meaning of the description is additionally described as follows:
Performing the enlarging process naturally produces a portion that cannot be displayed on one screen in the display section 2. However, the enlarging process is performed so that, as shown in FIG. 15, for content having a layout designed for vertical scrolling, horizontal scrolling cannot be performed, that is, no block can horizontally run over the display section 2.

For example, in the case of vertically written text such as a novel, horizontal scrolling is performed, and in the vertical direction, the enlarging process in FIG. 13 is executed so that vertical scrolling does not need to be performed. In other words, an enlarging process is not performed in which content in a block cannot be viewed unless scrolling is performed in two directions.

Even after the enlarging process is performed on the example in FIG. 15, no changes occurs in the layouts of the blocks similarly to the example of displayed content shown in FIG. 3. By performing the enlarging process in this manner without changing layout, content can be provided to the user without changing the intention of the content creator.

When the user operates the enlargement button 3-1 in the state of the displayed content shown in FIG. 15, the enlarging process in FIG. 13 is executed again, and the display state of content shown in FIG. 16 appears. In the display state of content in FIG. 16, the text display block 43-1 has been moved downward, as a different portion compared with the display state shown in FIG. 15, from the right side of the image display block 42.

At first, by enlarging the image display block 42, the possible drawing region on the right of the image display block 42 is reduced in size. Although the enlarging process on the text display block 43-1 is subsequently executed, the region on the right of the reduced image display block 42, the enlarged text display block 43-1 cannot be displayed.

In other words, it is determined in step S52 that the virtual drawing region for displaying the text display block 43-1 does not fall within the possible drawing region, and the process proceeds to step S57.

In step S57, a block rule for the text display block 43-1 is referred to. In this case, line 25 of the content data 51 in FIG. 4 is referred to, and it is determined that the above block rule is identified as block rule 3. Based on block rule 3, the shape of the block is changed.

In this case, the block is changed in shape from the state shown in FIG. 16 in which the text display block 43-1 is longer than is wide to the state shown in FIG. 16 in which text display block 43-1 is long from side to side. The block is changed in shape, whereby the text display block 43-1 is displayed in the position shown in FIG. 16 and in enlarged form, with no portion of the block running over.

By using the above enlargement, the user can enlarge content to a desired size. Although display of the content as shown in FIG. 16 change the display positions of the blocks, the blocks are disposed without changing the display order, that is, the order that the content creator wishes for the user to view the blocks. This enables display of content substantially based on the intention of the content creator, even if the layout of the content is changed.

As described above, the display states of content shown in FIGS. 15 and 16 show a case in which one virtual page is displayed in a virtual drawing region. What is actually displayed in the display section 2 is a portion of the content shown in FIG. 15 or 16. For example, a case in which the content in FIG. 16 is displayed in the display section 2 is shown in FIG. 17.

Figure 17:
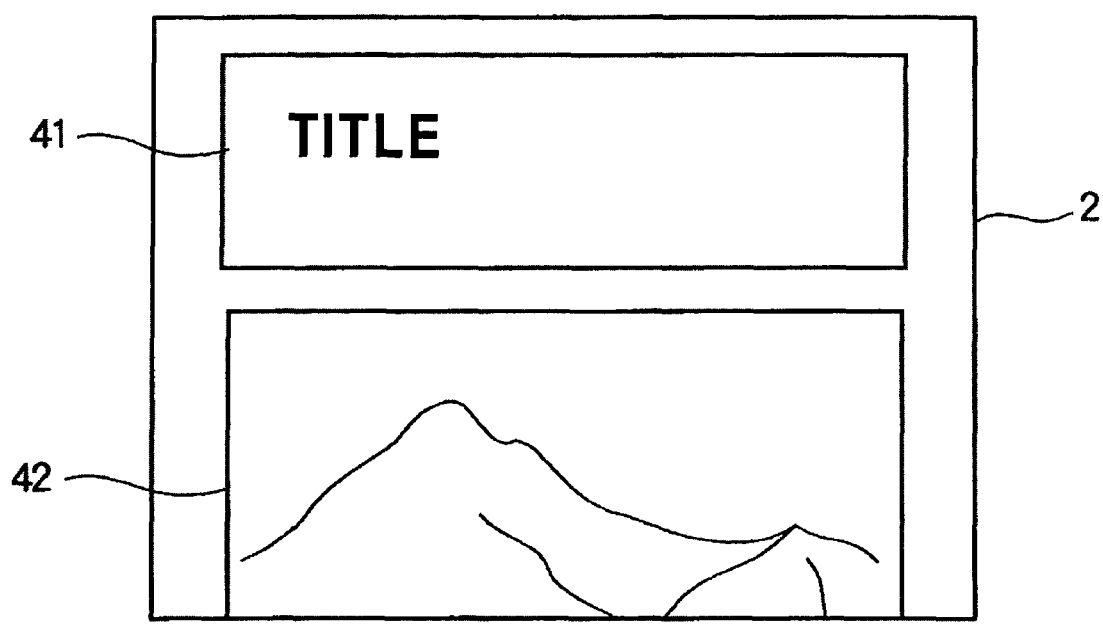
FIG. 17 is an illustration of display of blocks.

As FIG. 17 shows, it is possible that enlarged display of the content causes a case in which a block (the image display block 42 in FIG. 17) is halfway displayed. When an object drawn in the block is text, for example, when the object is text such as a novel, even if the block is halfway displayed, no problem is raised by using scrolling to enable a view. Also, such a situation easily occurs.

However, when the object drawn in the block is an image, and the block is halfway (partly) displayed, even if scrolling enables viewing the entirety of the image, the entirety of the image cannot be grasped. This is not a preferable situation, and has a problem.

Accordingly, a mechanism may be provided in which, when an object drawn in a block is text, the block is permitted to be displayed in a form in which it is halfway displayed, and when an object drawn in a block is an image, the block is not permitted to be displayed in a form in which it is halfway displayed.

The mechanism is realized, for example, by adding steps to the enlarging process in FIG. 13. A process provided with the mechanism is described below with reference to the flowchart shown in FIG. 18. A description of steps S71 to S73 is omitted since they are identical to the steps S51 to S53 shown in FIG. 13.

After an object (content) to be drawn in a block is acquired in step S73, it is determined in step S74 whether or not the object is related to an image. Determination of whether or not the object is related to an image is performed by referring to the "Type" of the acquired object.

By way of example, referring to the content data 51 in FIG. 4, when it is written in line 33 that "Type"="Text", it is indicated that the object is text. When it is written in line 39 that "Type"="Image", it is indicated that the object is an image. Accordingly, by referring to the "Type" of an object, it can be determined whether or not the object is an image.

When it is determined in step S74 that the acquired object (object to be processed) is an image, the process proceeds to step S75. In step S75, it is determined whether or not the block (virtual drawing region) which is being processed can be displayed on a single screen in the display section 2, together with the previous block.

Regarding this determination, referring again to FIG. 17, the block which is being processed is the image display block 42, and the previous block before the image display block 42 becomes the title display block 41. Accordingly, it is determined in step S75 whether or not the title display block 41 and the image display block 42 can be simultaneously displayed in the display section 2, in other words, whether or not the block of the image display block 42 is prevented from being halfway displayed, as shown in FIG. 17.

When it is determined in step S75 that the virtual drawing region cannot be displayed on a single screen in the display section 2 together with the object of the previous block, that is, when display on the same screen causes a state in which the block being processed is halfway displayed, the process proceeds to step S76. In step S76, the block which is being processed is set so as to be displayed in the next page in order that the block which is being processed is displayed in a page different from that having the previous block.

In other words, a predetermined size space is provided between the previous block and the block which is being processed.

Also, when it is determined in step S74 that the acquired object (to be processed) is not an image, when it is determined in step S75 that both the block which is being processed and the previous block fall within the same screen, or when the setting in step S76 for displaying the block which is being processed in the next page ends, the process proceeds to step S77.

A description of steps S77 to S80 is omitted since they are almost identical to the steps S54 to S57 shown in the flowchart in FIG. 13.

Figure 18:
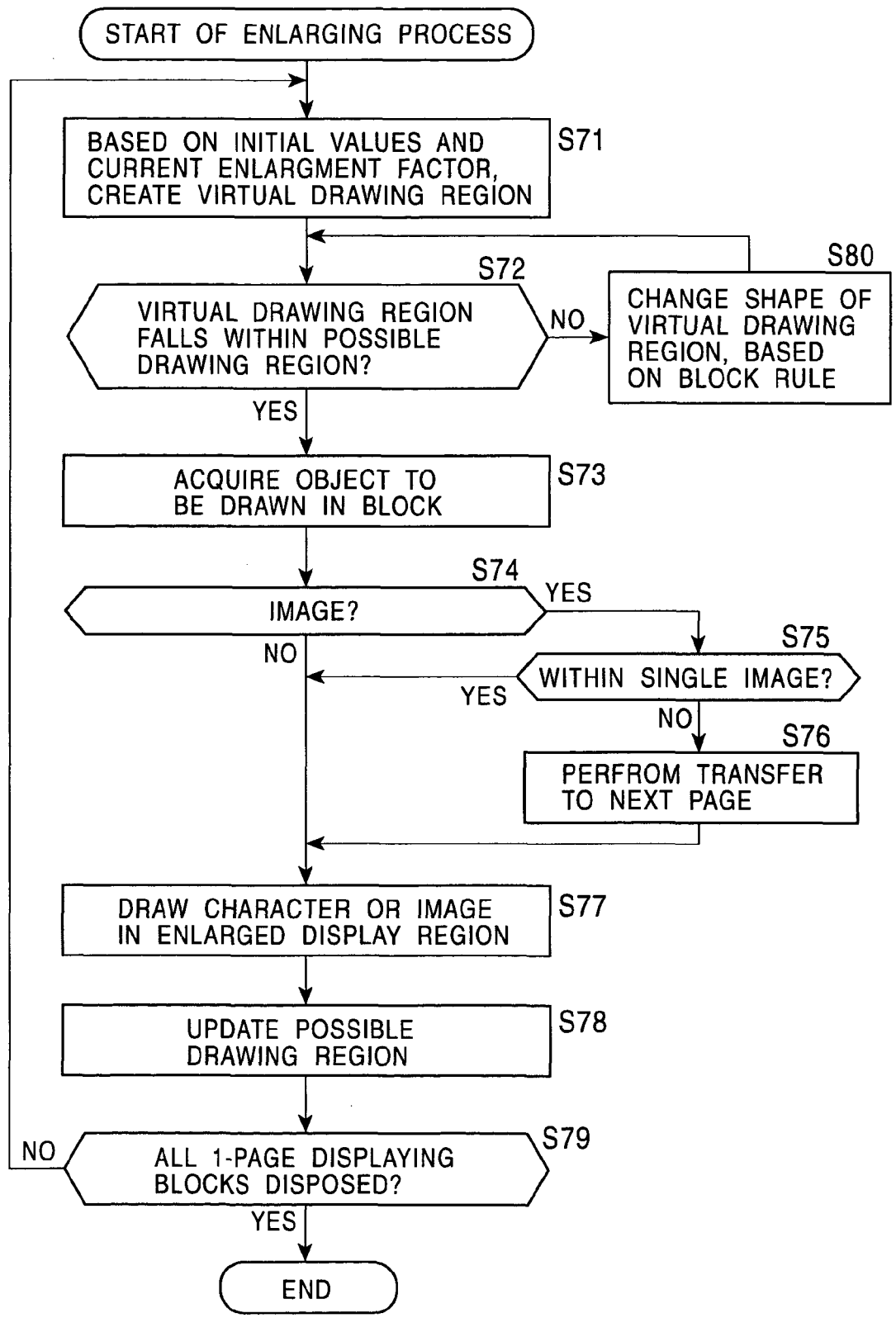
FIG. 18 is a flowchart illustrating a process for enlarging the entirety of a page.

Although, in the enlarging process shown in FIG. 18, it is determined whether or not the acquired object is an image, it may be determined which of block rules 5 or 6 is used. Block rules 5 and 6 are mainly used for images. Thus, in the case of determining whether or not the object is an image, by determining which of block rules 5 and 6 is used, the enlarging process in FIG. 18 can perform similar processing.

By performing the above processing, content which is not desired to be halfway displayed, such as an image, can be prevented from being halfway displayed.

When processing is performed so that a block in which a predetermined object is drawn is prevented from being halfway displayed, and also when the block in which the predetermined object (an image in the above embodiment) is drawn is enlarged to the maximum, the enlarged size must be limited to a size almost equal to that of the displayable region of the display section 2.

Figure 19:
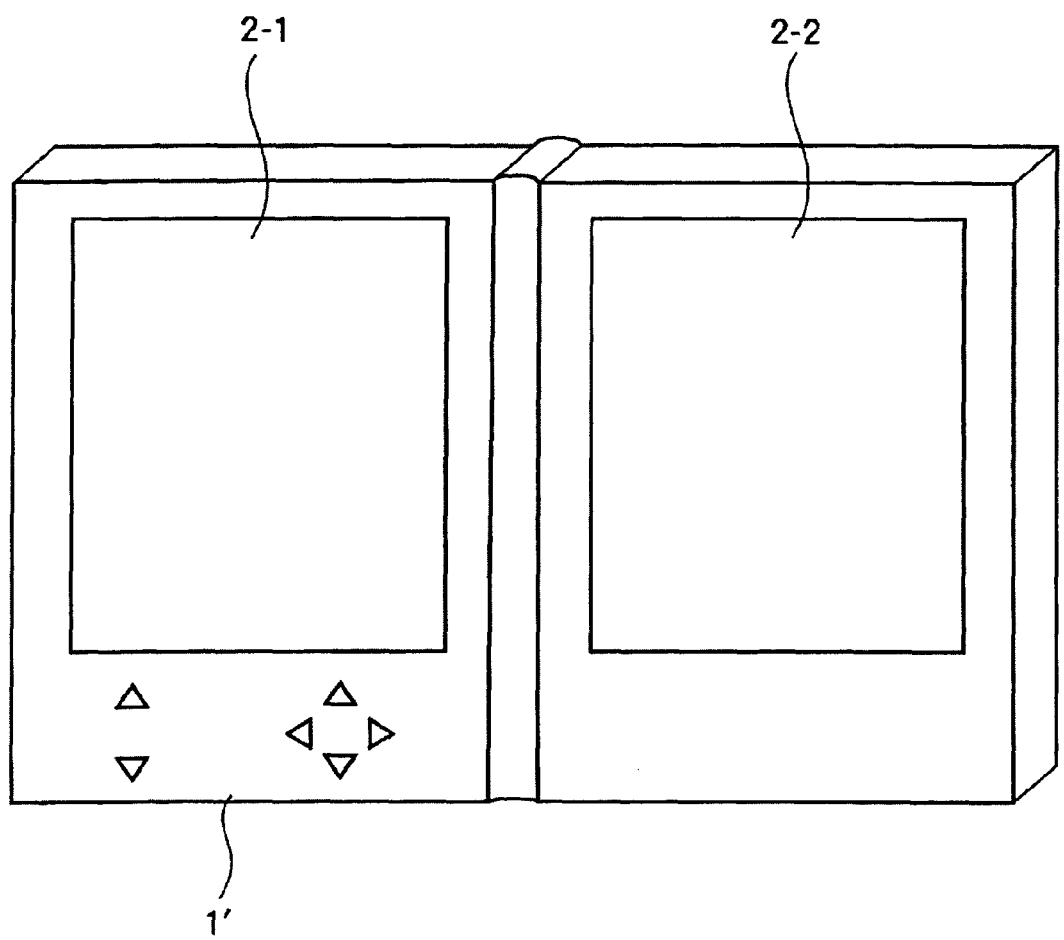
FIG. 19 is a perspective exterior view showing a user terminal 1' having two screens.

In addition, regarding the user terminal 1 in the above embodiment, an example in which the display section 2 has a single screen has been described. However, the present invention may be applied to a case in which the user terminal 1 has two screens. FIG. 19 is an exterior partial view of a user terminal 1' (the dash is put to distinguish from the user terminal 1 (shown in FIG. 1) including a single screen) including a display section 2 composed of two screens.

As shown in FIG. 19, the user terminal 1' includes right and left display sections 2-2 and 2-1 each having a screen. The left display section 2-1 is similar in structure to the user terminal 1 shown in FIG. 1, and includes an enlargement button 3-1. The user terminal 1 has a configuration in which the right display section 2-2 is added to the unit identical in structure to the user terminal 1. The user terminal 1' may have a foldable form. In the case of the foldable form, the user terminal 1' in FIG. 19 is in a state in which it is opened.

Figure 20:
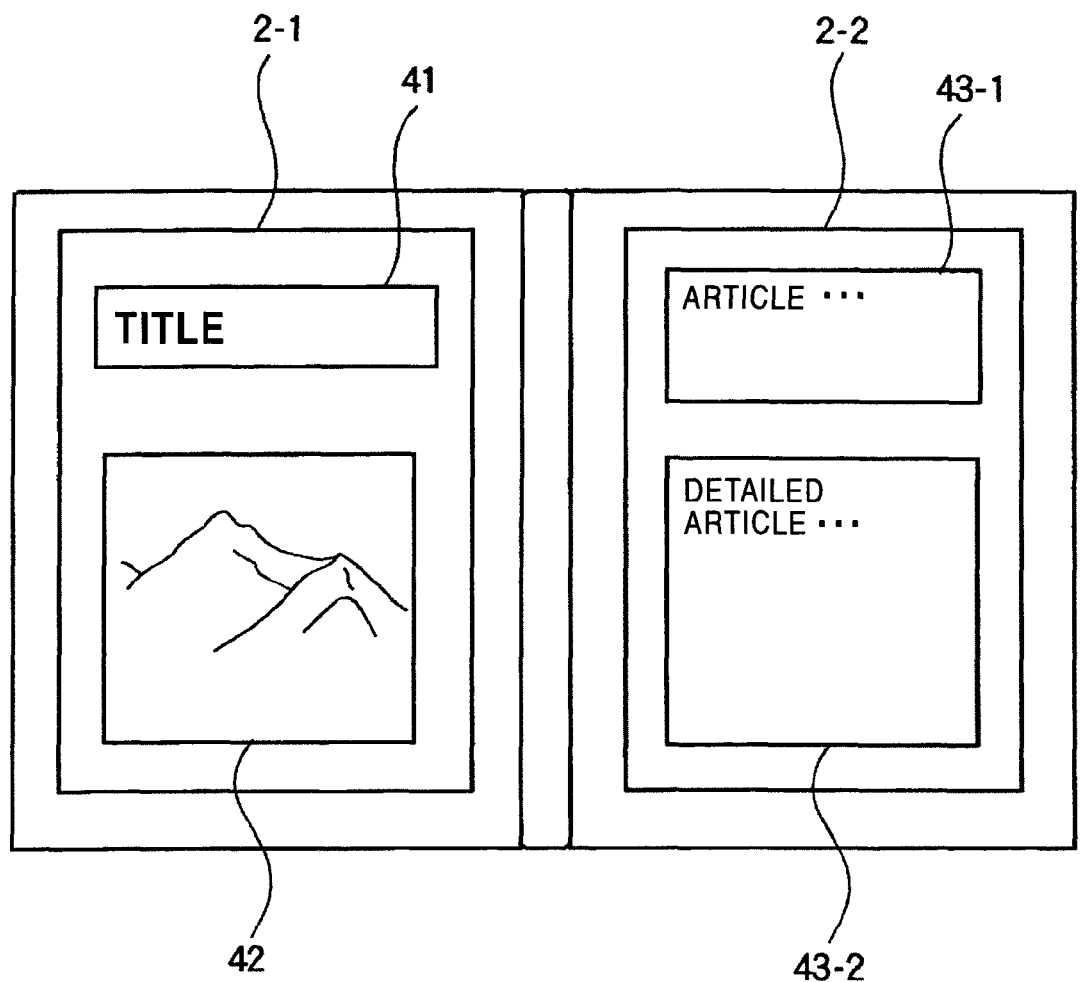
FIG. 20 is an illustration of screens displayed on the user terminal 1'.
Figure 21:
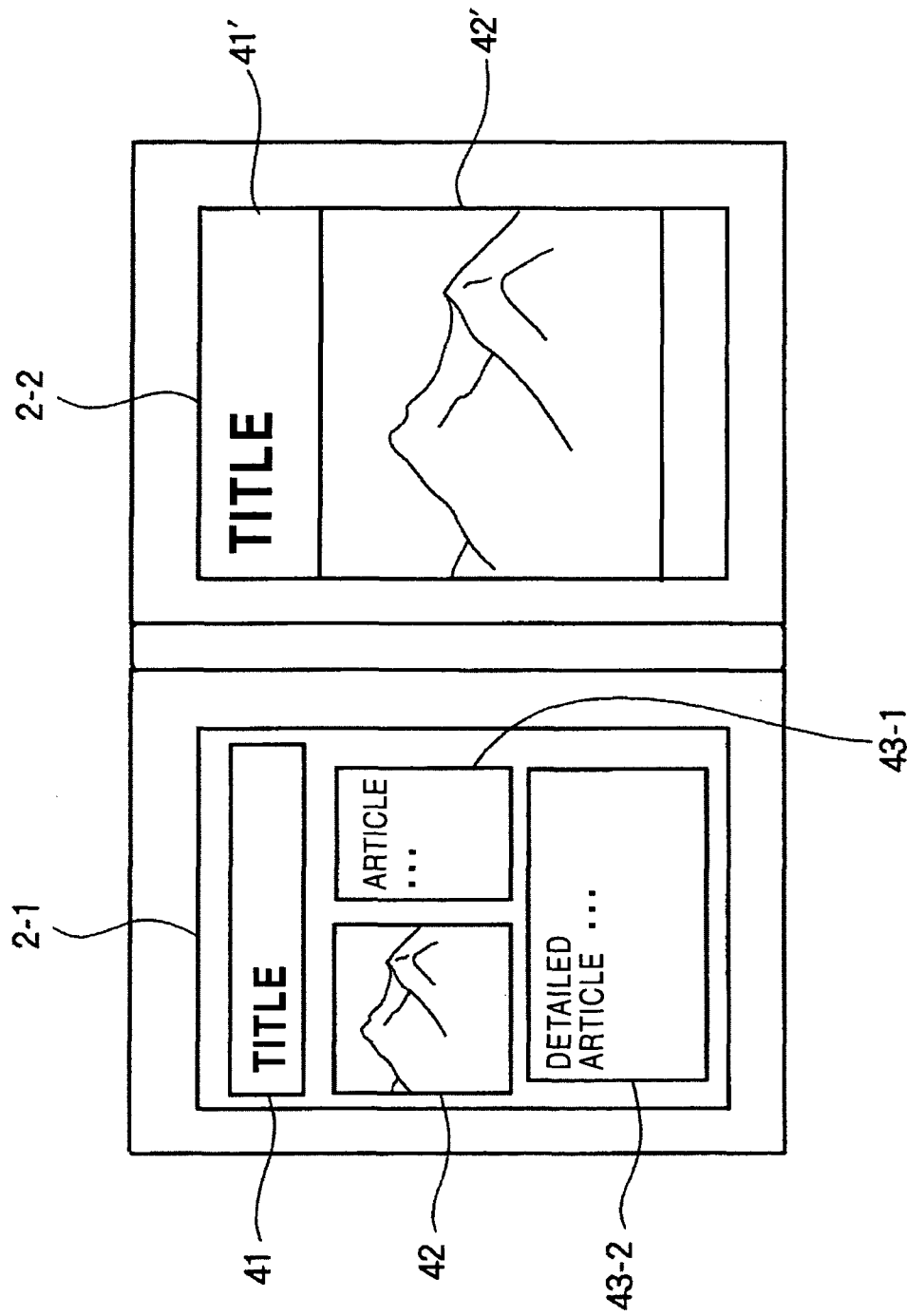
FIG. 21 is an illustration of screens displayed on the user terminal 1'.

When the user terminal 1' displays enlarged content as shown in FIG. 16, for example, the content is displayed as shown in FIG. 20. In FIGS. 20 and 21, the display sections 2-1 and 2-2 are only shown, and an enlargement button 3-1, etc., are omitted.

As shown in FIG. 20, in the user terminal 1' having two screens, for example, the display section 2-1 displays the title display block 41 and the image display block 42, and the display section displays the text display block 43-1 and the text display block 43-2.

As described above, by using the two screens, also for enlarged content, the content can be displayed so that the user can view the entirety of the content, even if such processing as to bother the user is not performed.

The user terminal 1' includes the two screens, whereby it can display content, as shown in FIG. 21. As shown in FIG. 21, the display section 2-1 displays the content shown in FIG. 3, and the display section 2-2 displays part of the content (formed by enlarging the content in FIG. 3) in FIGS. 15 or 16. In other words, the content is displayed in the display section 2-1 without changing layout intended by the creator of the content, and content enlarged so as to be easily viewed by the user is displayed in the display section 2-2.

Figure 22:
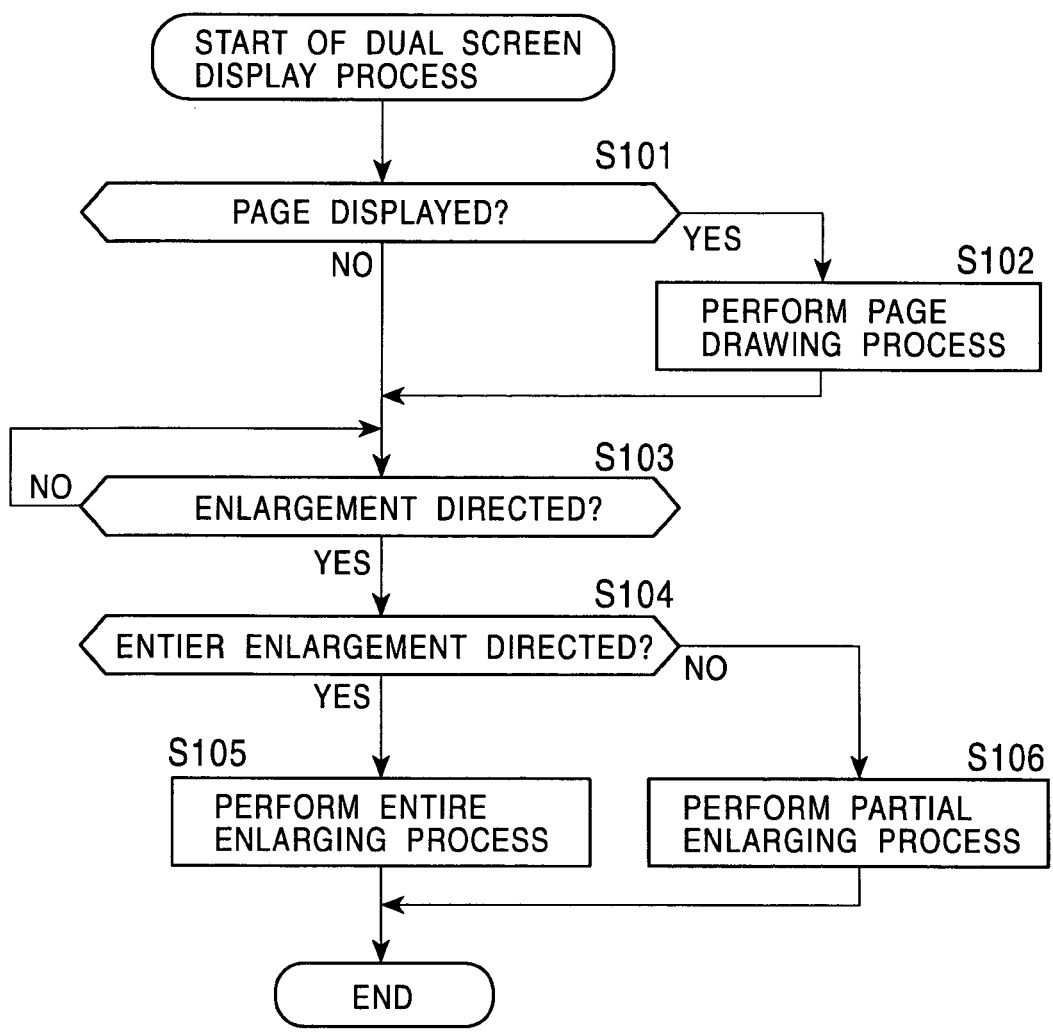
FIG. 22 is a flowchart illustrating a process for displaying the screens shown in FIG. 21.

A dual screen display process of the user terminal 1' is described below with reference to the flowchart shown in FIG. 22.

In step S101, it is determined whether or not a predetermined page is displayed in the display section 2-1 (FIG. 21). This determination is related to a subsequent step in which enlargement of content (page) is directed. For the page displayed in the display section 2-1, enlargement is directed. Accordingly, the process does not proceed to the subsequent step unless the page is displayed in the display section 2-1. Thus, step S101 is executed.

When it is determined in step S102 that no page is displayed in the display section 2-1, the process proceeds to step S102, and a drawing process on a designated page is performed. The page drawing process in step S102 is performed in accordance with the flowchart in FIG. 9. A description of the flowchart in FIG. 9 is omitted since the flowchart in FIG. 9 has already been described. By executing the process in FIG. 9, the display section 2-1 displays the screen in the display section 2-1 (the screen in FIG. 3).

In a state in which the predetermined page is displayed in the display section 2-1, that is, when it is determined that the predetermined page is displayed in the display section 2-1, or the predetermined page drawing process in step 102 ends, the process proceeds to step S103. In step S103, it is determined whether or not enlargement has been directed for the page (content) displayed in the display section 2-1. This determination is performed by determining whether or not the enlargement button 3-1 is operated.

When it is determined in step S103 that the enlargement is directed, the process proceeds to step S104. In step S104, it is determined whether or not which is to be enlarged between the entire page displayed in the display section 2-1 and part of the page. In this embodiment, as described above, enlargement can be directed for each block.

When enlargement is directed for each block, the user can direct enlargement of a desired block, for example, by moving the displayed cursor to selectively move the desired block, and executing a predetermined operation for indicating determination. In step S104, it is determined whether or not such a direction has been issued.

When it is determined in step S104 that enlargement on the entire page has been directed, the process proceeds to step S105, and an enlarging process on the entire page is executed. The enlarging process performed in step S105 is executed in accordance with the flowchart in FIG. 13 or 18.

The process in FIG. 13 or 18 is executed, whereby, for example, the display state of content shown in FIG. 16 is virtually formed and part of the virtually formed state is displayed in the display section 2-2. The display section 2-2 in FIG. 21 shows a case in which part of the display state in FIG. 16 is displayed in response to direction of the enlarging process on the entire page.

In addition, when it is determined in step S104 that the enlargement of the entire page has not been directed, that is, when it is determined that enlargement of a predetermined block has been directed, the process proceeds to step S106, and a partial enlarging process is executed. The partial enlarging process in step S106 is executed in accordance with the flowchart shown in FIG. 11. By executing the process in FIG. 11, for example, on the title display block 41, a screen as shown in FIG. 12 is displayed in the display section 2-2.

As described above, the user can view the desired portion (block) in form enlarged in the display section 2-2 while viewing the page displayed in the display section 2-1. Accordingly, the user can recognize the desired content in the display section 2-2 while enjoying the layout intended by the content creator in the display section 2-1.

A technique may be used which performs displaying an index in the display section 2-1, and, when a predetermined item is selected from the index, displaying the content of the selected item in the display section 2-2.

Although the above consecutive processing may be executed by hardware having each function, it may be executed by software. When the consecutive processing is executed by software, programs constituting the software are installed from a recording medium into a computer built into dedicated hardware, or, for example, a multipurpose personal computer in which various functions can be executed by installing various programs.

As shown in FIG. 2, separately from the personal computer as the user terminal 1, the types of the recording medium include, not only package media including a magnetic disk 21 (including a flexible disk), an optical disk 22 (compact-disk read-only memory (CD-ROM), a digital versatile disk (DVD), a magneto-optical disk 23 (MiniDisk (MD) (registered trademark)), or a semiconductor memory 24, which contains programs and which is distributed to provide users with the programs, but also the ROM 12, which stores programs, and a hard disk unit including the storage unit 17.

In this Specification, steps constituting a program provided by the medium not only definitely include processes executed in time series in accordance with the given order, but also processes which are executed in parallel or separately if the processes are not always executed in time series.

What is claimed is:

1. An information processing device comprising:
   storage means for storing content data of predetermined content; and
   display control means for controlling display of the predetermined content on a display screen based on the stored content data, wherein:
   the predetermined content is divided into a plurality of blocks to be concurrently displayed on the display screen in a consecutive order, and the content data includes positional data which relates to the blocks and which is for setting a position on the display screen of a subsequent block to be displayed on the display screen relative to a position of a previous block on the display screen, from the subsequent block and the previous block identifying different blocks of the predetermined content; and
   said display control means controls the display of the predetermined content by, based on the positional data, sequentially controlling display of one predetermined block in a predetermined position in units of the blocks, said positional data including data that describes the position of the subsequent block on the display screen in terms relative to the position of the previous block on the display screen such that said positional data includes one or more values that define a dimensional shift, in one or more directions of the display screen by an amount corresponding to the one or more values, between a start point of the subsequent block and an end point of the previous block.

2. An information processing device according to claim 1, wherein said display control means controls two different screens, and in said display control means, display of the content based on the content data on one screen is controlled, and display on the other screen of content formed by enlarging the predetermined block in the predetermined content is controlled.

3. An information processing device according to claim 1, wherein, when enlargement is directed for the predetermined block, said display control means extracts pieces of the content data which relate to the predetermined block for which the enlargement is directed, and controls content based on the pieces of the content data so as to be displayed at a predetermined magnification.

4. An information processing method comprising:
controlling storage of content data of predetermined content; and
controlling, based on the content data in which the storage thereof is controlled in said controlling storage, display of the predetermined content on a display screen,
wherein:
the predetermined content is divided into a plurality of blocks to be concurrently displayed on a display screen in a consecutive order, and the content data includes positional data which relates to the blocks and which is for setting a position on the display screen of a subsequent block to be displayed on the display screen described relative to a position of a previous block on the display screen, the subsequent block and the previous block identifying different blocks of the predetermined content; and
in said display control step, the display of the predetermined content is controlled by, based on the positional data, sequentially controlling display of one predetermined block in a predetermined position in units of the blocks, said positional data including data that describes the position of the subsequent block on the display screen in terms relative to the position of the previous block on the display screen such that said positional data includes one or more values that define a dimensional shift, in one or more directions of the display screen by an amount corresponding to the one or more values, between a start point of the subsequent block and an end point of the previous block.

5. A recording medium containing a computer-readable program for performing a method, comprising:
controlling storage of content data of predetermined content; and
controlling, based on the content data in which the storage thereof is controlled in said storage control step, display of the predetermined content on a display screen,
wherein:
the predetermined content is divided into a plurality of blocks to be concurrently displayed on the display screen in a consecutive order, and the content data includes positional data which relates to the blocks and which is for setting a position on the display screen of a subsequent block to be displayed on the display screen described relative to a position of a previous block on the display screen, the subsequent block and the previous block identifying different blocks of the predetermined content; and
in said controlling display, the display of the predetermined content is controlled by, based on the positional data, sequentially controlling display of one predetermined block in a predetermined position in units of the blocks, said positional data including data that describes the position of the subsequent block on the display screen in terms relative to the position of the previous block on the display screen such that said positional data includes one or more values that define a dimensional shift, in one or more directions of the display screen by an amount corresponding to the one or more values, between a start point of the subsequent block and an end point of the previous block.

6. An information processing device according to claim 1, wherein, based on a command to initiate an enlarging process on the previous block, said display control means:
creates a virtual drawing region based on said positional data;
determines whether the virtual drawing region falls within a possible drawing region corresponding to a horizontal display capacity of the display screen;
changes a shape of the virtual drawing region, when the virtual drawing region does not comply with the horizontal display capacity, to comply with the horizontal display capacity, by moving the subsequent block to below the previous block; and
displays the previous block and subsequent block in accordance with the virtual drawing region.

7. An information processing device according to claim 6, wherein:
the enlarging process enlarges the subsequent block, and a shape of the subsequent block is changed when the subsequent block contains text content, as identified by block type information for the subsequent block.

8. An information processing device according to claim 6, wherein:
a shape of the previous block is not changed when the previous block contains image content, as identified by block type information for the subsequent block.

9. An information processing device, comprising:
a storage unit configured to store content data of predetermined content; and
a display control unit configured to control display of the predetermined content on a display screen based on the stored content data,
wherein:
the predetermined content is divided into a plurality of blocks to be concurrently displayed on the display screen in a consecutive order, and the content data includes positional data which relates to the blocks and which is for setting a position on the display screen of a subsequent block to be displayed on the display screen relative to a position of a previous block on the display screen, the subsequent block and the previous block identifying different blocks of the predetermined content; and
said display control unit is further configured to control the display of the predetermined content by, based on the positional data, sequentially controlling display of one predetermined block in a predetermined position in units of the blocks, said positional data including data that describes the position of the subsequent block on the display screen in terms relative to the position of the previous block on the display screen such that said positional data includes one or more values that define a dimensional shift, in one or more directions of the display screen by an amount corresponding of the one or more values, between a start point of the subsequent block and an end point of the previous block.

10. An information processing device according to claim 9, wherein said display control unit is further configured to control two different display screens, and in said display control unit, display of the content based on the content data on one display screen is controlled, and display on the other display screen of content formed by enlarging the predetermined block in the predetermined content is controlled.

11. An information processing device according to claim 9, wherein, when enlargement is directed for the predetermined block, said display control unit is further configured to extract pieces of the content data which relate to the predetermined block for which the enlargement is directed, and is further configured to control content based on the pieces of the content data so as to be displayed at a predetermined magnification.

* * * * *